United States Patent
Li et al.

(10) Patent No.: US 11,629,965 B2
(45) Date of Patent: *Apr. 18, 2023

(54) METHODS, APPARATUS, AND SYSTEMS FOR LOCALIZATION AND MAPPING

(71) Applicant: Qfeeltech (Beijing) Co., Ltd., Beijing (CN)

(72) Inventors: Shuailing Li, Beijing (CN); Ming Chi, Beijing (CN); Yiming Zhang, Beijing (CN); Zhen Chen, Beijing (CN)

(73) Assignee: QFEELTECH (BEIJING) CO., LTD., Beijing (CN)

( * ) Notice: Subject to any disclaimer, the term of this patent is extended or adjusted under 35 U.S.C. 154(b) by 236 days.

This patent is subject to a terminal disclaimer.

(21) Appl. No.: 16/994,579

(22) Filed: Aug. 15, 2020

(65) Prior Publication Data

US 2020/0378767 A1 Dec. 3, 2020

Related U.S. Application Data

(63) Continuation of application No. 16/718,560, filed on Dec. 18, 2019, now Pat. No. 10,782,137, which is a (Continued)

(30) Foreign Application Priority Data

Jan. 28, 2019 (CN) .......................... 201910109823.0

(51) Int. Cl.
*G01C 21/12* (2006.01)
*G01C 21/32* (2006.01)
(Continued)

(52) U.S. Cl.
CPC ............. *G01C 21/32* (2013.01); *G01C 21/12* (2013.01); *G01C 21/3811* (2020.08);
(Continued)

(58) Field of Classification Search
CPC ...... G01C 21/32; G01C 21/12; G01C 21/165; G06T 7/579; G06T 7/73;
(Continued)

(56) References Cited

U.S. PATENT DOCUMENTS 7,177,737 B2 2/2007 Karlsson et al.
9,286,810 B2 3/2016 Eade et al.
(Continued)

FOREIGN PATENT DOCUMENTS

CN 107677279 A 2/2018
CN 108682027 A 10/2018
(Continued)

OTHER PUBLICATIONS

Chen et al., Vision-Based Positioning for Internet-of-Vehicles, 2016, IEEE, p. 364-376 (Year: 2016).*
(Continued)

*Primary Examiner* — Mcdieunel Marc
(74) *Attorney, Agent, or Firm* — Millburn IP PLLC

(57) ABSTRACT

A method includes acquiring an image through a visual sensor during a movement of a mobile device. The method includes matching the image with key frames stored in a key frame database. The key frames are created based on two-dimensional coordinates of feature points included in a plurality of images previously acquired through the visual sensor. The method also includes computing a visual relative pose based on two-dimensional coordinates of matching feature points included in both of the image and the one or more key frames that have been matched with the image. The method also includes computing relevant information of the visual relative pose based on the two-dimensional coordinates of the matching feature points. The method further includes updating an absolute pose of the mobile device and a map based on the relevant information of the visual
(Continued)

relative pose and relevant information of a dead reckoning based relative pose.

20 Claims, 10 Drawing Sheets

Related U.S. Application Data continuation of application No. PCT/CN2019/102686, filed on Aug. 27, 2019.

(60) Provisional application No. 62/926,030, filed on Oct. 25, 2019.

(51) Int. Cl.
*G06T 7/73* (2017.01)
*G01C 21/00* (2006.01)
*G05D 1/00* (2006.01)

(52) U.S. Cl.
CPC ............ *G01C 21/3848* (2020.08); *G06T 7/73* (2017.01); *G05D 1/0088* (2013.01)

(58) Field of Classification Search
CPC . G06T 2207/10016; G06T 2207/30244; G06T 7/13; G06T 7/74; G06T 2207/10021; G06T 2207/20021; G06T 2207/30252; G05D 1/0088; G05D 1/0253; G05D 1/0274; G05D 1/0251; G05D 1/027; G05D 1/0246; G05D 1/0272; G06V 20/10; G06V 10/507; G06V 10/44; G06V 20/64; H04N 13/239; B25J 9/1697; B25J 13/08; Y10S 901/01
See application file for complete search history.

(56) References Cited

U.S. PATENT DOCUMENTS

| | | | |
|---|---|---|---|
| 9,329,598 B2 | 5/2016 | Pack et al. | |
| 9,483,054 B2 | 11/2016 | Karlsson et al. | |
| 9,886,037 B2 | 2/2018 | Karlsson et al. | |
| 9,910,444 B2 | 3/2018 | Eade et al. | |
| 10,133,278 B2 * | 11/2018 | Shin | G05D 1/0253 |
| 10,133,279 B2 * | 11/2018 | Shin | G06V 20/10 |
| 10,269,147 B2 * | 4/2019 | Jones | G06V 20/64 |
| 10,269,148 B2 * | 4/2019 | Jones | G06T 7/73 |
| 10,275,649 B2 * | 4/2019 | Shin | G06T 7/285 |
| 10,290,049 B1 | 5/2019 | Xu et al. | |
| 10,307,910 B2 * | 6/2019 | Shin | G06T 7/13 |
| 10,390,003 B1 | 8/2019 | Liu et al. | |
| 10,399,228 B2 * | 9/2019 | Shin | G06T 7/74 |
| 10,482,674 B1 | 11/2019 | Wu et al. | |
| 10,496,104 B1 | 12/2019 | Liu et al. | |
| 10,782,137 B2 * | 9/2020 | Li | G06T 7/579 |
| 11,263,777 B2 | 3/2022 | Homma | |
| 2009/0087122 A1 | 4/2009 | Xu et al. | |
| 2012/0121161 A1 | 5/2012 | Eade et al. | |
| 2016/0005229 A1 | 1/2016 | Lee et al. | |
| 2016/0335809 A1 | 11/2016 | Forutanpour et al. | |
| 2017/0046868 A1 | 2/2017 | Chernov et al. | |
| 2017/0151674 A1 * | 6/2017 | Shin | G06T 7/13 |
| 2017/0151675 A1 * | 6/2017 | Shin | G05D 1/0251 |
| 2018/0061107 A1 | 3/2018 | Anderson et al. | |
| 2018/0315232 A1 * | 11/2018 | Jones | G06T 17/205 |
| 2018/0364731 A1 | 12/2018 | Liu et al. | |

FOREIGN PATENT DOCUMENTS

| | | |
|---|---|---|
| CN | 110337671 A | 10/2019 |
| EP | 3624060 A1 | 3/2020 |
| JP | 2013-537995 A | 10/2013 |
| WO | 2012/040644 A1 | 3/2012 |
| WO | 2017172778 A1 | 10/2017 |
| WO | WO2017172778 A1 | 10/2017 |
| WO | 2018/207426 A1 | 11/2018 |
| WO | 2018207426 A1 | 11/2018 |

OTHER PUBLICATIONS

He et al., Portable 3D visual sensor based indoor localization on mobile device, 2016, IEEE, p. 1-4 (Year: 2016).*
Yii et al., Distributed visual processing for augmented reality, 2012, IEEE, p. 41-48 (Year: 2012).*
Antigny et al., Continuous Pose Estimation for Urban Pedestrian Mobility Applications on Smart-Handheld Devices, 2018, IEEE, p. 1-8 (Year: 2018).*
International Search Report dated Nov. 28, 2019, in PCT/CN2019/102686, and English translation.
Written Opinion dated Nov. 28, 2019, in PCT/CN2019/102686, and English translation.
Martinez-Carranza J., et al., "Enhancing 6D Visual Relocalisation with Depth Cameras," 2013 IEEE/RSJ International Conference on Intelligent Robots and Systems (IROS), Nov. 3-7, 2013, Tokyo, Japan, pp. 899-906 (8 pages).
He X., et al., "Portable 3D Visual Sensor Based Indoor Localization on Mobile Device," 2016 13th IEEE Annual Consumer Communications & Networking Conference (CCNC) (4 pages).
Sattler T., et al., "Are Large-Scale 3D Models Really Necessary for Accurate Visual Localization?" 2017 IEEE Conference on Computer Vision and Pattern Recognition, pp. 6175-6184 (10 pages).
Elloumi W., et al., "Indoor Pedestrian Localization With a Smartphone: A Comparison of Inertial and Vision-Based Methods," IEEE Sensors Journal, vol. 16, No. 13, Jul. 1, 2016, pp. 5376-5388 (13 pages).
Extended European Search Report dated Oct. 7, 2022, issued in European Application No. 19913780.3, filed on Aug. 25, 2021 (9 pages).
Murali V. et al., "Utilizing Semantic Visual Landmarks for Precise Vehicle Navigation," arxiv. org, Cornell University Library, 201 Olin Library Cornell University Ithaca, NY 14853, Jan. 3, 2018, XP081212318 (.
Chiu, H.-P., et al., "Sub-Meter Vehicle Navigation Using Efficient Pre-Mapped Visual Landmarks," 2016 IEEE 19th International Conference on Intelligent Transportation Systems (ITSC), Rio de Janeiro, Brazil, Nov. 1-4, 2016, pp. 505-512 (8 pages).
Notice of Reasons for Refusal dated Nov. 1, 2022, in Japanese Patent Application No. 2021-543539, and English machine translation (12 pages).
First Office Action issued in Chinese Patent Application No. 201910109823.0, dated Jan. 18, 2023, and partial English machine translation (15 pages).

* cited by examiner

METHODS, APPARATUS, AND SYSTEMS FOR LOCALIZATION AND MAPPING

CROSS-REFERENCE TO RELATED APPLICATIONS

This application is a continuation application of U.S. patent application Ser. No. 16/718,560, filed on Dec. 18, 2019, which is a continuation application of International Application No. PCT/CN2019/102686, filed on Aug. 27, 2019, which claims priority to Chinese Patent Application No. 201910109823.0, filed on Jan. 28, 2019. This application also claims priority to U.S. provisional application No. 62/926,030, filed on Oct. 25, 2019. The entire contents of all of the above-mentioned applications are incorporated herein by reference.

TECHNICAL FIELD

The present disclosure relates to the technology field of mobile devices and, more particularly, to methods, apparatus (e.g., a computer-readable storage medium and/or mobile device), and systems for localization and mapping.

BACKGROUND

Mobile devices such as robotic devices may operate autonomously or semi-autonomously, which can be implemented in various scenes. A mobile device may obtain environmental information through multiple sensors, and may correspondingly react in response to the environmental information, such that the mobile device can accomplish predetermined tasks safely, reliably, highly efficiently, and intelligently.

Simultaneous Localization and Mapping ("SLAM") refers to a method in which the mobile device starts moving from an unknown location in an unknown environment, and performs self localization (e.g., determining poses of the mobile device in the environment) based on a map of the environment during the movement. In the meantime, the mobile device constructs or updates the map (e.g., mapping) based on the self localization, thereby realizing the autonomous localization and navigation of the mobile device.

Visual SLAM ("VSLAM") refers to a method in which a mobile device realizes autonomous localization and mapping using a visual system, which has advantages of low cost and strong adaptability. In a system for visual simultaneous localization and mapping (also referred to as a "VSLAM system" for simplicity), methods based on visual images and dead reckoning are combined to perform localization and mapping for the mobile device.

In the currently available VSLAM related technologies, computation is typically performed based on vision to obtain a visual relative pose. When computing the visual relative pose, first, in general, feature points of the current image are matched with feature points of one or more pre-established landmarks. Then the visual relative pose may be computed based on three-dimensional coordinates of the feature points of a matching landmark. The three-dimensional coordinates of a feature point generally refer to three-dimensional coordinates of a spatial point in the environment, which may correspond to the feature point in a camera coordinate system. The three-dimensional coordinates in the camera coordinate system may be converted to those in a global coordinate system. If the three-dimensional coordinates of the feature point are coordinates in the global coordinate system, and if the origin of the global coordinate system is selected to be an initial location point of the mobile device in the global coordinate system, then the visual relative pose is the same as a visual absolute pose (i.e., an absolute pose obtained based on vision).

The three-dimensional coordinates of the spatial point corresponding to the feature point are generally obtained by computation based on two selected frames of images. The two frames of images involved in the computation need to satisfy certain conditions in order to compute the three-dimensional coordinates of the spatial point. For example, there need to be a sufficient number of feature points included in the two frames of images that can be matched with one another, a distance between the two frames of images in the space needs to be within a predetermined range, etc. In some scenes, for example, when an image acquisition period is relatively long, or when differences between consecutively acquired images are relatively large, the computation of the three-dimensional coordinates of the feature point tends to fail, which may result in a reduction in the success rate of landmark creation, and a reduction in the number of landmarks that can be used for matching in the database. As a result, the subsequent VSLAM computation result may not be sufficiently accurate, which may affect the ultimate result of localization and mapping.

SUMMARY OF THE DISCLOSURE

To overcome the existing issues in the related technology at least to a certain extent, the present disclosure provides methods, apparatus (e.g., computer-readable storage media and/or mobile devices), and systems for autonomous and/or semi-autonomous localization and mapping.

In accordance with an embodiment of the present disclosure, a method is provided. The method may be a method of localization and mapping (e.g., autonomous or semi-autonomous), which may be based on SLAM technology (e.g., VSLAM technology disclosed herein). The method may include:

receiving an image obtained by a visual sensor;

retrieving a key frame from a pre-established key frame database, and after the key frame is retrieved, matching the image with the retrieved key frame;

computing relevant information of a visual relative pose based on the image and the key frame that have been successfully matched, wherein the visual relative pose is computed based on two-dimensional coordinates of matching feature points between the image and the key frame that have been successfully matched; and based on a determination that the relevant information of the visual relative pose is obtained, updating an absolute pose and a map of a mobile device based on the relevant information of the visual relative pose and relevant information of a dead reckoning based relative pose.

In some embodiments, the key frame includes an absolute pose, wherein the absolute pose is a pose of the mobile device in a global coordinate system when capturing an image based on which the key frame is created, wherein the map includes an absolute pose of at least one node. The method may further include:

updating an absolute pose included in the key frame corresponding to a node based on an absolute pose of the node in the updated map.

In some embodiments, computing the relevant information of the visual relative pose based on the image and the key frame that have been successfully matched may include:

sorting key frames that have been successfully matched;

orderly selecting a key frame that has been successfully matched as a candidate frame;

computing the visual relative pose based on the two-dimensional coordinates of a feature point of the image and the two-dimensional coordinates of a feature point of the candidate frame, and based on Epipolar geometry principles;

determining whether the visual relative pose is reasonable based on a predetermined reasonableness condition;

re-selecting another key frame as the candidate frame and performing subsequent computation, until a cycle is terminated, wherein the cycle is terminated when: a number of reasonable visual relative poses reaches a predetermined threshold number, or, all key frames that have been successfully matched have been selected;

after the cycle is terminated, based on a determination that there is a reasonable visual relative pose, adding the reasonable visual relative pose and relevant information of the reasonable visual relative pose to a pre-processing result, wherein the relevant information of the reasonable visual relative pose includes at least one of: a covariance matrix or two associated node identifications. For example, the relevant information of the reasonable visual relative pose may include the covariance matrix and two associated node identifications.

In some embodiments, the method may also include:

when a predetermined creation condition is satisfied, extracting a feature point from the image, and obtaining the two-dimensional coordinates of the feature point and a descriptor of the feature point;

when a number of extracted feature points is greater than or equal to a predetermined extraction threshold value, creating a new key frame, and storing the new key frame in the key frame database, wherein the new key frame is created based on at least one of: the two-dimensional coordinates of the feature points or descriptors of the feature points. For example, the new key frame may be created based on the two-dimensional coordinates of the feature points and the descriptors of the feature points.

In some embodiments, the key frame also includes an absolute pose, wherein the absolute pose is a pose of the mobile device in a global coordinate system when capturing an image based on which the key frame is created. The method may further include:

computing an absolute pose corresponding to the image based on an absolute pose of a preceding image or key frame and the dead reckoning based relative pose corresponding to a time interval between the image and the preceding image or key frame.

In some embodiments, the method may also include:

receiving an original pose obtained by a dead reckoning sensor; or receiving motion data obtained by the dead reckoning sensor and computing the original pose based on the motion data; and computing the relevant information of the dead reckoning based relative pose based on the original pose.

In some embodiments, updating the absolute pose and the map of the mobile device based on the relevant information of the visual relative pose and the relevant information of the dead reckoning based relative pose may include:

creating a current node after the relevant information of the visual relative pose is obtained;

determining an odometer edge based on the relevant information of the dead reckoning based relative pose, and connecting the current node to an existing, last created node through the odometer edge;

when there is a key frame node associated with the current node in existing nodes, determining a visual edge based on the relevant information of the visual relative pose, connecting the current node to the associated key frame node through the visual edge, and performing a graph optimization based on the nodes and edges to obtain an updated absolute pose and an updated map of the mobile device.

In some embodiments, the method may also include:

based on a determination that the relevant information of the visual relative pose cannot be or is not obtained, updating the absolute pose of the mobile device at a most recent time instance based on the relevant information of the dead reckoning based relative pose.

In some embodiments, the two-dimensional coordinates are two-dimensional coordinates of the feature point in the pixel coordinate system.

In accordance with another aspect, the present disclosure provides a controller, including:

a processor, and a memory configured to store instructions or codes executable by the processor, wherein when the instructions stored in the memory are executed by the processor, the instructions cause the processor to perform any of the disclosed methods.

In accordance with another aspect, the present disclosure provides a mobile device, including:

a dead reckoning sensor configured to provide an original pose or motion data. The dead reckoning sensor may directly obtain the original pose or compute the original pose based on the motion data;

a visual sensor configured to acquire an image; and a controller operably coupled with the dead reckoning sensor and the visual sensor, and configured to perform any of the disclosed methods.

In accordance with another aspect, the present disclosure provides a non-transitory computer-readable storage medium configured to store computer-executable instructions. When the computer-executable instructions stored in the storage medium are executed by the controller of the mobile device or a processor, the computer-executable instructions are configured to cause the controller or the processor to perform any of the disclosed methods.

In accordance with another aspect, the present disclosure provides a device. The device may be configured for localization and mapping (e.g., autonomous or semi-autonomous) based on, for example, SLAM technology (such as VSLAM technology disclosed herein). The device may include:

a first receiving module configured to receive an image obtained by a visual sensor;

a matching module configured to retrieve a key frame from a pre-established key frame database, and after retrieving the key frame, match the image with the retrieved key frame;

a first computation module configured to compute relevant information of a visual relative pose based on the image and the key frame that have been successfully matched, and wherein the visual relative pose is computed based on two-dimensional coordinates of matching feature points between the image and the key frame that have been successfully matched;

a first updating module configured to update an absolute pose and a map of the mobile device based on the relevant information of the visual relative pose and the relevant information of the dead reckoning based relative pose, after the relevant information of the visual relative pose is obtained.

In some embodiments, the key frame may include: an absolute pose, the absolute pose being a pose of the mobile device in a global coordinate system when acquiring an image based on which the key frame is created, wherein the map includes an absolute pose of at least one node. The device may also include:

a second updating module configured to update an absolute pose included in the key frame corresponding to a node based on an absolute pose of the node included in the updated map.

In some embodiments, the first computation module may be configured to:

sort key frames that have been successfully matched;

orderly select a key frame that has been successfully matched as a candidate frame;

compute the visual relative pose based on two-dimensional coordinates of a feature point of the image and two-dimensional coordinates of a feature point of the candidate frame and based on Epipolar geometry principle;

determine whether the visual relative pose is reasonable based on a predetermined reasonableness condition;

re-select another key frame as the candidate frame and perform subsequent computations until a cycle is terminated. The cycle may be terminated when: a number of reasonable visual relative poses reaches a predetermined threshold number, or when all of the key frames that have been successfully matched have been selected;

after the cycle is terminate, based on a determination that there is a reasonable visual relative pose, adding the reasonable visual relative pose and relevant information of the reasonable visual relative pose to a pre-processing result, wherein the relevant information of the reasonable visual relative pose includes at least one of: a covariance matrix or two associated node identifications. For example, the relevant information of the reasonable visual relative pose may include the covariance matrix and two associated node identifications.

In some embodiments, the device may also include:

a creation module configured to extract a feature point of the image and obtain two-dimensional coordinates of the feature point and a descriptor of the feature point, when a predetermined creation condition is satisfied; create a new key frame when a number of extracted feature points is greater than or equal to a predetermined extraction threshold value, and store the new key frame into the key frame database, wherein the new key frame may be created based on at least one of: the two-dimensional coordinates of the feature points or descriptors of the feature points. For example, the new key frame may be created based on the two-dimensional coordinates of the feature points and the descriptors of the feature points.

In some embodiments, the key frame may include: an absolute pose, wherein the absolute pose is a pose of the mobile device in a global coordinate system when acquiring an image based on which the key frame is created. The device may also include:

an acquisition module configured to compute an absolute pose corresponding to the image based on an absolute pose corresponding to a preceding image or key frame and a dead reckoning based relative pose corresponding to a time interval between the image and the preceding image or key frame.

In some embodiments, the device may also include:

a second receiving module configured to receive an original pose obtained by the dead reckoning sensor; or to receive motion data obtained by the dead reckoning sensor, and compute the original pose based on the motion data;

a second computation module configured to compute the relevant information of the dead reckoning based relative pose based on the original pose.

In some embodiments, the first updating module may be configured to:

create a current node after the relevant information of the visual relative pose is obtained;

determine an odometer edge based on the relevant information of the dead reckoning based relative pose, and connect the current node to an existing, last created node through the odometer edge;

when there is a key frame node associated with the current node in the existing nodes, determine a visual edge based on the relevant information of the visual relative pose, and connect the current node to the associated key frame node through the visual edge; and perform a graph optimization based on the nodes and edges to obtain an updated absolute pose and an updated map of the mobile device.

In some embodiments, the device may also include:

a third updating module configured to update an absolute pose of the mobile device at the most recent time instance based on the relevant information of the dead reckoning based relative pose when the relevant information of the visual relative pose cannot be or is not obtained.

In some embodiments, the two-dimensional coordinates are two-dimensional coordinates of the feature point in the pixel coordinate system.

The technical solutions provided by the present disclosure have the following advantages:

by adopting two-dimensional coordinates of feature points that match with one another while computing the visual relative pose, rather than three-dimensional coordinates of a spatial point corresponding to a feature point, various restriction issues associated with the computation of the three-dimensional coordinates can be avoided, thereby increasing the success rate of computing the visual relative pose, and further improving the accuracy of the ultimate result of localization and mapping and computation speed.

It should be understood that the above general descriptions and the following detailed descriptions are only illustrative and explanatory, and are not intended to limit the scope of the present disclosure.

BRIEF DESCRIPTION OF THE DRAWINGS

The accompanying drawings are incorporated into the specification, and form parts of the specification. The drawings illustrate some embodiments of the present disclosure, and explain, together with the specification, the principle of the present disclosure.

DETAILED DESCRIPTION

Figure 1:
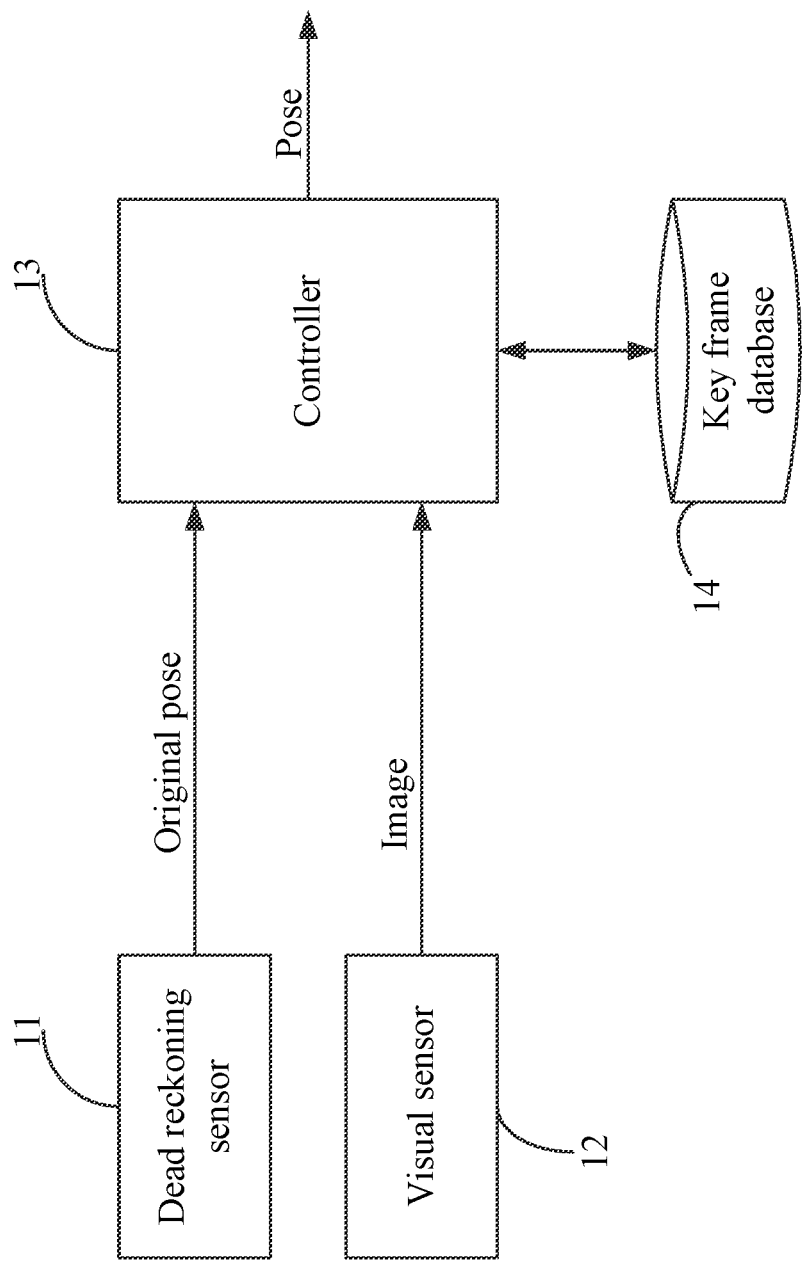
FIG. 1 is a schematic diagram of a structural configuration of a system for localization and mapping, according to an example embodiment.

The embodiments of the present disclosure will be described below. Examples of the embodiments are shown in the accompanying drawings, in which the same or similar umbers refer to the same or similar elements used in the following descriptions and the drawings, unless otherwise specified. It will be appreciated that the implementation methods described below in the illustrative embodiments do not represent all of the implementation methods consistent with the present disclosure. Rather, they are merely some examples of the devices, apparatus, systems, and methods that are consistent with some aspects of the present disclosure as described in detail in the claims.

As used herein, the term "mapping" refers to constructing or building a map that may be used for navigation or determining a location of a movable device or a mobile device. The term "localization" refers to determining a location of the mobile device in an environment, which may be represented by the map. The term "node" refers to a data structure that stores information indicating a pose of the mobile device at a specific time instance. The "node" may also store other information, such as numbering, key frame, etc. The term "edge" refers to a data structure that stores information indicating relative relationships between nodes. The information may include poses, covariances (e.g., covariance matrices), and identifications of the nodes.

The singular forms "a," "an," and "the" are intended to include the plural forms as well, unless the context indicates otherwise. And, the terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B.

The term "unit" or "module" may encompass a hardware component, a software component, or a combination thereof. For example, a "unit" or "module" may include a housing, a device, a sensor, a processor, an algorithm, a circuit, an electrical or mechanical connector, etc. The term "processor" may include a hardware component, a software component, or a combination thereof. For example, the term "processor" may be a central processing unit ("CPU"), a graphical processing unit ("GPU"), an application-specific integrated circuit ("ASIC"), a programmable logic device ("PLD"), such as a complex programmable logic device ("CPLD"), a field-programmable gate array ("FPGA"), etc. The term "memory" may include a volatile or non-volatile memory, such as a read-only memory ("ROM"), a random access memory ("RAM"), an electrically programmable read only memory ("EPROM"), or an electrically erasable programmable read only memory ("EEPROM"), etc.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

At least one of the embodiments of the present disclosure relates to a mobile device, such as a cleaning robot, an accompany type mobile robot, a service type mobile robot, an industrial inspection smart device, a security robot, a driverless vehicle, an unmanned aerial vehicle, etc. The cleaning robot may be, for example, a smart floor sweeping machine, a smart floor wiping machine, a window cleaning robot. An accompany type mobile robot may be, for example, a smart electronic pet, a nanny robot. A service type mobile robot may be, for example, a receptionist robot for a hotel, an inn, a meeting place. An industrial inspection smart device may include, for example, a power line inspection robot, a smart forklift. A security robot may be, for example, a home or commercial use smart guard robot.

Sensors frequently used in a mobile device may include:

(1) Wheel encoder, which is a digital encoder configured to measure an angular displacement of the mobile device. The wheel encoder has the advantages of a strong resolving capability, a high measurement precision, and reliable operations, etc. The wheel encoder is one of the most frequently used displacement sensors for measuring a position of a rotation angle. When combined with the known size of the wheels, the wheel encoder may be used for localization of the mobile device and/or measuring the velocity of the mobile device.

(2) Inertial measurement unit ("IMU"), which includes a gyroscope and/or an accelerometer. The gyroscope is a device configured to detect or measure an angular movement of the mobile device. An angle of the mobile device may be obtained from an integration of the angular velocity. A pose of the mobile device in a three-dimensional space may be computed using a three-axis gyroscope. The accelerometer is a device configured to detect or measure an acceleration of the mobile device. A velocity may be obtained from an integration of the acceleration. A displacement may be obtained from an integration of the velocity.

(3) Camera, which is a device configured to perceive the surrounding environment, which may have a low cost, and may provide abundant information for localization, mapping, recognizing an object/obstacle, etc. The camera may be a monocular camera, a binocular camera, a multiocular camera, or any other suitable camera. A monocular camera may not provide a reference scale. Therefore, in practice, the monocular camera may be operated in combination with other sensors. A binocular camera and a multiocular camera can each provide the scale of the space. It is noted that the term "camera" as used herein is not limited to cameras, but may also include other suitable imaging devices, such as infrared, radar, or laser based imaging devices.

Other sensors may include a Global Position System ("GPS"), a 2D/3D laser distance measurement sensor, an ultrasonic distance measurement sensor, etc. The above-described wheel encoder and IMU are examples of dead reckoning sensors.

A method for localization and mapping, such as for autonomous or semi-autonomous localization and mapping based on SLAM technology (e.g., a VSLAM technology) may include the following processes: feature extraction, image matching, data fusion, etc.

Feature extraction can extract and obtain image features from an image. Frequently used image features may include point features and line features. In this description, point features are primarily introduced as examples of the image features. Various methods may be used to extract the point features, such as Harris, Features from Accelerated Segment Test ("FAST"), Oriented FAST and Rotated BRIEF ("ORB"), Scale-invariant Feature Transform ("SIFT"), Speeded Up Robust Features ("SURF"), etc., and methods based on deep learning for extracting point features. In this description, ORB is used as an example method for extracting point features. ORB uses a FAST algorithm to detect point features. A feature point (which is a point with feature description) may be represented by coordinates in an image. This method is based on image grayscale values of regions surrounding the feature points, and may include detecting pixel values of pixel points in regions surrounding a candidate feature point for a complete circle. If the regions surrounding the candidate feature point include a sufficient number of pixel points each having a sufficiently large difference in grayscale value as compared with the candidate feature point, the candidate feature point may be treated as a feature point. In the following equation:

$$N = \sum_{x \forall (circle(p))} |I(x) - I(p)| > \varepsilon_d.$$

I(x) represents a grayscale value of any pixel point on a circumference defined with the candidate feature point as a circle center, and a radius of a predetermined value. I(p) represents the circle center, i.e., the grayscale value of the candidate feature point. $\varepsilon_d$ represents a predetermined threshold value for the difference in the grayscale value. If N is greater than a given predetermined threshold value, it may be determined that p is a feature point. N is in general three quarters (¾) of a total number of I(x).

To obtain faster results, an additional acceleration method may be used. For example, in one method, if 4 pixel points surrounding the candidate feature point at every 90-degree angle have been measured, there should be at least 3 pixel points having a sufficiently large difference in grayscale value as compared with the candidate feature point; otherwise, there is no need to compute other pixel points, and the candidate feature point can be regarded as not being a feature point. A selection radius of a circle surrounding the candidate feature point is an important parameter. For simplicity and efficiency, in the example described here, the radius is 3, and there are 16 surrounding pixel points in total that are to be compared. To increase the comparison efficiency, typically only K surrounding pixel points are used for comparison, as used in the FAST-K method. After a feature point is obtained, the properties of the feature point may be described in a certain manner. The output of these properties may be referred to as a descriptor of the feature point. ORB adopts a Binary Robust Independent Elementary Features ("BRIEF") algorithm to compute the descriptor of the feature point.

The core concept of the BRIEF algorithm is to select N point pairs surrounding the feature point P based on a predetermined mode, and combine the comparison results of the N point pairs as the descriptor. The detailed steps may include:

1). Drawing a circle O using a key point P as the circle center, and d as the radius.

2). Selecting N point pairs in the circle O based on a predetermined mode. For the convenience of description, here it is assumed that N=4. In practical applications, N may be any suitable number, such as 512. It is assumed that the 4 point pairs currently selected are labeled respectively as:

$$P_1(A,B), P_2(A,B), P_3(A,B), P_4(A,B).$$

3). Defining an operation T as:

$$T(P(A, B)) = \begin{cases} 1 & I_A > I_B \\ 0 & I_A \le I_B \end{cases},$$

where, $I_A$ represents the grayscale value of pixel point A, and $I_B$ represents the grayscale value of pixel point B.

4). Performing the operation T on the selected pixel points respectively, and combining obtained results can arrive at the ultimate descriptor. If:

$$T(P_1(A,B))=1,$$

$$T(P_2(A,B))=0,$$

$$T(P_3(A,B))=1,$$

$$T(P_4(A,B))=1,$$

then the ultimate descriptor is: 1011.

To maintain the rotation invariance of the feature point, a facing direction may be added for the feature point. Using the feature point P as the circle center, R as the radius, a grayscale center of mass C of the region defined by the circle center P and the radius R may be computed. PC is the facing direction of the feature point. In the following equations:

$$\theta = \alpha \tan 2(M_{01}, M_{10}),$$

$$M_{01} = \sum_{x=-R}^{R} \sum_{y=-R}^{R} yI(x, y),$$

$$M_{10} = \sum_{x=-R}^{R} \sum_{y=-R}^{R} xI(x, y),$$

θ represents the facing direction of the feature point, I(x,y) represents the grayscale value of the pixel point having coordinates (x0+x, y0+y), (x0, y0) represent the coordinates of the feature point, x and y represent the offset of the coordinates.

For image matching, given a current image, to inquire for an image similar to the current image in an existing database, the most straightforward method is to traverse the entire database to perform comparisons. However, this method has a low efficiency. Currently, a widely used method is the Bag of Words ("BoW") method. The BoW method may include the following steps.

(1). Feature Extraction

Assuming there are N images, and the i-th image is composed of n(i) feature points, i.e., is represented by n(i) feature vectors, then a total number of sum(n(i)) feature vectors (i.e., words) may be obtained. In general, a feature vector may be represented by a descriptor of the feature point. Alternatively, after the descriptor is normalized based on the facing direction, the feature vector may be represented by a normalized descriptor. The feature vector may be customized and designed based on the feature used. Frequently used feature may include Color histogram, SIFT, local binary pattern ("LBP") etc.

(2). Codebook Generation

Clustering (using, e.g., K-means clustering method etc.) may be performed for the feature vectors obtained in the above step to obtain K clustering centers. The codebook may be constructed or generated based on the clustering centers.

(3). Generation of Histogram Based on the Codebook

For each image, a computation based on a k-NN (nearest neighbor) algorithm may be performed to determine "which cluster" of words in the codebook each "word" of the image belongs to, thereby obtaining the BoW representation of the image corresponding to the codebook.

Currently, the model that is widely used in practical applications, such as a search engine, is the term frequency-inverse document frequency ("tf-idf") model. The primary principle of the tf-idf model is: if a word w appears in a frame of image d at a high frequency and rarely appears in other images, then the word w is regarded as having a high distinguishing capability, and is suitable for distinguishing the image d from other images. The model primarily includes two factors:

1) the Term Frequency ("tf") of the word w in the image d, i.e., a ratio between the count (w,d) of the word w appearing in the image d and the total number of words size (d) in the image d:

$tf(w,d) = \text{count}(w,d)/\text{size}(d)$.

2) the Inverse Document Frequency ("idf") of the word w in the entire set of images, i.e., the logarithm of the ratio between the total number n of images and the number of images docs (w,D) in which the word w appears:

$idf = \log(n/\text{docs}(w,D))$

In the tf-idf model, a weight is computed for each image d and an inquiry sequence q is formed by keywords w[1] . . . w[k], for representing a degree of matching between the inquiry sequence q and the image d:

$$tf\text{-}idf(q, d) =$$
$$\text{sum}\{i = 1 \ldots k \mid tf\text{-}idf(w[i], d)\} = \text{sum}\{i = 1 \ldots k \mid tf(w[i], d) * idf(w[i])\}.$$

After a pair of images is selected, corresponding feature points may be matched with one another on a one to one basis. The entire image may be traversed in the one to one comparison. A k-d tree may be adopted to accelerate the comparison. If a potential pose relationship can be obtained, the comparison may be accelerated based on Epipolar geometry principles. In addition, in some embodiments, deep learning may be adopted to search and match the images.

The currently available data fusion methods may be divided in two classes: filtering based methods and non-linear optimization based methods. The most classic filtering based method is the Kalman filter. The process function and the observation function used in the Kalman filter can be expressed as, respectively:

$X\_k = AX\_k{-}1 + Bu\_k + w\_k{-}1$, $Z\_k = HX\_k + v\_k$.

In the above functions, X_k represents a state vector of the system, A, B represent parameters of the process function, u_k represents an input of the system, w_k−1 represents process noise, Z_k represents an observation vector, H represents the parameter of the observation function, v_k represents observation noise.

The first equation indicates that each X_k may be represented by a linear random function. Any state vector X_k is a linear combination of a previous state vector of a previous state, an input u_k, and the process noise w_k−1.

The second equation indicates that each observation vector is a linear combination of a current state vector and the observation noise. The value of the observation vector generally follows, by default, a Gaussian distribution.

The process noise and the observation noise in these two equations are generally regarded as statistically independent. According to the Kalman filter, a current state vector may be predicted based on a state vector of a previous time instance of the system and a current input, as shown below:

$$\hat{x}_{\bar{k}} = A\hat{x}_{k-1} + Bu_k,$$

$$P_{\bar{k}} = AP_{k-1}A^T + Q.$$

In the above equations, $\hat{x}_{k-1}$ represents an estimate of the state vector at time instance k−1, $u_k$ represents the input at time instance k, $\hat{x}_{\bar{k}}$ represents a predicted value (i.e., prediction) of the state vector at time instance k, $P_{\bar{k}}$ represents the prediction of the covariance matrix of the state vector at time instance k, $P_{k-1}$ represents the covariance matrix of the state vector at time instance k−1, Q represents the covariance of the process noise, A, B represent parameters of the process function.

When the observation vector of the system is obtained, an estimate of the current state vector may be obtained based on the current observation vector and the prediction of the current state vector, as shown below:

$$K_k = P_{\bar{k}} H^T (H P_{\bar{k}} H^T + R)^{-1},$$

$$\hat{x}_k = \hat{x}_{\bar{k}} + K_k(z_k - H\hat{x}_{\bar{k}}),$$

$$P_k = (I - K_k H) P_{\bar{k}}.$$

In the above equations, $K_k$ represents the Kalman gain, R represents the covariance of the observation noise, $z_k$ represents an observation vector at time instance k, H represents the parameter of the observation function.

In practice, there are various other methods that are improvements based on the Kalman filter, such as the extended Kalman filter, unscented Kalman filter, iterative Kalman filter, multi-state Kalman filter, etc. Other filters include the particle filter, etc.

A filtering method is based on recursion, and a non-linear optimization method is based on iteration. Next, the non-linear optimization method is introduced.

If the minimum value of a given target function $\|f(x)\|_2^2$ is sought, then a Taylor expansion of the target function may be carried out around x:

$$\|f(x+\Delta x)\|_2^2 \approx \|f(x)\|_2^2 + J(x)\Delta x + \tfrac{1}{2}\Delta x^T H \Delta x.$$

Here J(x) represents a derivative of $\|f(x)\|_2^2$ with respect to x (Jacobian matrix), H represents the second order derivative (Hessian matrix). The first order item or the second order item of the Taylor expansion may be selectively reserved, and the corresponding solving method is the first order gradient method or the second order gradient method. If the first order gradient is reserved, then the solution for the increment may be:

$$\Delta x = -J^T(x).$$

Its intuitive meaning is simple, i.e., the forward moving is in an inverse gradient direction. Typically, a step size may be calculated in that direction, and the fastest descending manner may be obtained. This method may be referred to as the steepest descent method.

On the other hand, if the second order gradient information is reserved, the solution for the increment may be:

$$H\Delta x = -J^T(x).$$

This method may be referred to as the Newton's method. In addition, other methods may include Gauss-Newton method, Levenberg-Marquadt method, etc. In specific implementations, in some embodiments, optimization using a sliding window method or an incremental optimization ("iSAM") may be adopted.

Figure 6:
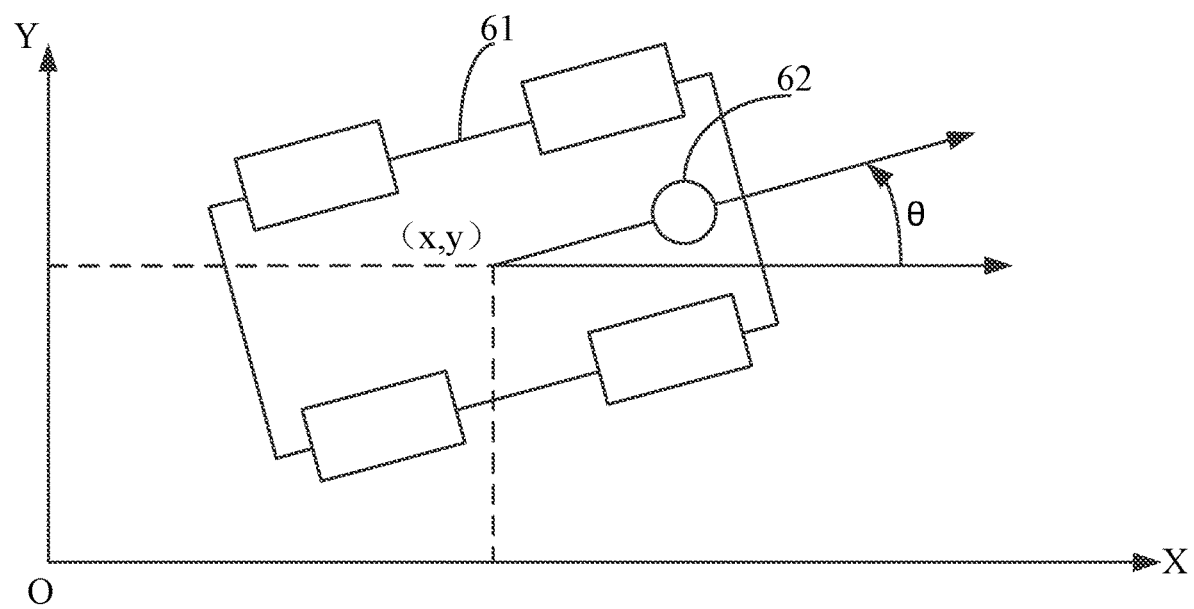
FIG. 6 is a schematic illustration of an absolute pose of a mobile device, according to an example embodiment.

For better understanding of the present disclosure, some terminologies used in the present disclosure are explained as follows:

Key frame: stored in a key frame database, each key frame may be created or constructed based on an image (e.g., a first image) acquired by the visual sensor. Unless specifically noted, the visual sensor is disposed at the mobile device. The visual sensor may include a camera, a video camera, or any other suitable imaging devices. The key frame may include at least one of the following groups of data: an absolute pose of the mobile device in the global coordinate system when acquiring the image based on which the key frame is created, or the two-dimensional coordinates of the feature points and the descriptors of the feature points in the image based on which the key frame is created. The absolute pose indicates the location and attitude. The location may be represented by coordinates. For example, when the mobile device moves in a two-dimensional space, as shown in FIG. 6, the absolute pose may be represented by three parameters (x, y, θ), where (x,y) indicate the location of the mobile device, θ indicates the attitude of the mobile device. In a three-dimensional space, the location of the mobile device may be represented by (x,y,z) of a Cartesian coordinate system, or (α,β, r) of a spherical coordinate system. The attitude of the mobile device may be represented by a facing direction of the mobile device or the camera of the mobile device, which is typically represented by an angle. For example, in the three-dimensional space, the attitude may be represented by (ψ, Ψ, θ). The three angles are typically referred to as the pitch angle, the roll angle, and the yaw angle. It should be noted that the key frame does not include three-dimensional coordinates of a spatial point in the environment corresponding to the feature point. Specifically, the key frame does not include the three-dimensional coordinates of the spatial point in the global coordinate system, and does not include the three-dimensional coordinates of the spatial point in the camera coordinate system. In other words, the key frame is created based on the two-dimensional coordinates of the feature point included in a captured image, rather than the three-dimensional coordinates (in the global coordinate system or the camera coordinate system) of the spatial point in the environment corresponding to the feature point included in the captured image.

The above two-dimensional coordinates refer to the two-dimensional coordinates of the feature point in the pixel coordinate system.

Absolute pose of the mobile device: i.e., the absolute pose of the mobile device in the global coordinate system, which refers to the location and attitude of the mobile device in the global coordinate system.

Absolute pose of a node: data of the node stored in a controller, the value of which is consistent with the absolute pose of the mobile device when the node is created.

Original pose: obtained through data provided by the dead reckoning sensor. For example, the dead reckoning sensor may directly provide an original pose, or the dead reckoning sensor may provide motion data, and the controller may calculate the original pose based on the motion data. The original pose is also an absolute amount, which is different from a relative amount, and can be understood as an absolute pose of the mobile device prior to an optimization. It should be noted that unless specifically noted in the present disclosure, the present description uses the dead reckoning sensor directly providing the original pose as an example to explain the technical solution.

Global coordinate system: a coordinate system fixed in the environment.

Dead reckoning based relative pose: a relative amount, provided by the dead reckoning sensor, between an absolute pose of the mobile device at a first time instance and an absolute pose of the mobile device at a second time instance.

Visual relative pose: a relative amount between an absolute pose of the mobile device at a first time instance and an absolute pose of the mobile device at a second time instance, obtained based on a current image captured by the visual sensor and a key frame from the key frame database that is successfully matched with the current image. The visual relative pose may be obtained from computation based on two-dimensional coordinates of feature points that match with one another between the successfully matched image and the key frame. The visual relative pose relates to the visual sensor and not the dead reckoning sensor.

The above-described absolute pose at the first time instance refers to the absolute pose of the mobile device when the current image is acquired by the visual sensor, and the absolute pose at the second time instance refers to the absolute pose included in the key frame that matches with the current image.

Each of the above-described relative amounts in the dead reckoning based relative pose and the visual relative pose includes a relative amount in the location and a relative amount in the attitude.

It should be noted that in the present disclosure, the relative amount in the attitude of the visual relative pose and the relative amount in the attitude of the dead reckoning based relative pose may have the same format or form, and the relative amount in the location of the visual relative pose and the relative amount in the location of the dead reckoning based relative pose may have different formats or forms. In the present disclosure, the dimension of the relative amount in the location of the visual relative pose may be one dimension less than the dimension of the relative amount in the location of the dead reckoning based relative pose.

For example, in the example shown in FIG. 6 where the mobile device moves in a two-dimensional space, in a typical manner, the dead reckoning based relative pose may be represented by (Δx, Δy, Δθ). In the present disclosure, the visual relative pose may be represented by (Δα,Δθ), where $\Delta\alpha = \arcsin(\Delta y / \sqrt{(\Delta x^2 + \Delta y^2)})$.

It should be noted, that in practical computation of the present disclosure, Δx, Δy may not be computed. Rather, (Δα,Δθ) may be directly computed. The detailed computation method can refer to latter descriptions. In the dead reckoning based relative pose, ($\Delta x$, $\Delta y$, $\Delta \theta$) may need to be calculated. Similarly, when the mobile device moves in a three-dimensional space, the visual relative pose may be represented by 5 parameter values ($\Delta \alpha, \Delta \beta, \Delta \varnothing, \Delta \psi, \Delta \theta$), whereas the dead reckoning based relative pose may be represented by 6 parameter values ($\Delta \alpha, \Delta \beta, \Delta r, \Delta \varnothing, \Delta \psi, \Delta \theta$). From the above comparison, it is shown that the relative amount in the location of the visual relative pose has one dimension less than the relative amount in the location of the dead reckoning based relative pose.

FIG. 1 is a schematic diagram of a configuration of a system for localization and mapping (e.g., autonomous or semi-autonomous) based on SLAM technology (e.g., the VSLAM technology disclosed herein), according to an embodiment of the present disclosure.

As shown in FIG. 1, the system may include at least one of: a dead reckoning sensor 11, a visual sensor 12, a controller 13, or a key frame database 14. For example, in some embodiments, the system may include the dead reckoning sensor 11, the visual sensor 12, the controller 13, and the key frame database 14. In some embodiments, one or more of these elements of the system may be omitted. The dead reckoning sensor 11 may be configured to generate an original pose of the mobile device or generate motion data of the mobile device for computing the original pose. The visual sensor 12 may include a camera (including, for example, a video camera), and/or an infrared imaging device, etc., which may be configured to acquire images. The controller 13 may be configured for localization and/or mapping based on the original pose and images acquired by and transmitted from the visual sensor. It is understood that the pose output by the controller 13 shown in FIG. 1 may refer to an updated absolute pose of the mobile device. The key frame database 14 may be any suitable database configured to store data, such as key frame data. The key frame database 14 may be communicatively connected with the controller 13, as shown in FIG. 1.

The system of the present disclosure based on the disclosed VSLAM technology may be implemented in the technical field of mobile devices, such as mobile robots. Thus, the system may include components that are included in the mobile device.

The controller 13 may include a hardware component, a software component, a firmware component, or any suitable combination thereof. Examples of the detailed configuration of the controller 13 can refer to FIG. 2 and FIG. 3.

The motion data generated by the dead reckoning sensor 11 may include at least one of displacement data, velocity data (including linear velocity data and/or angular velocity data), acceleration data, or angle data of the mobile device. The controller 13 may compute the original pose based on the motion data generated by the dead reckoning sensor 11. Alternatively, in some embodiments, the dead reckoning sensor 11 may compute the original pose based on the motion data, and provide the original pose to the controller 13. Unless otherwise specifically noted, the present description uses the dead reckoning sensor 11 providing the original pose to the controller 13 as an example to explain the technical solutions.

Due to the limitation on the performance of the dead reckoning sensor 11, the motion data or the original pose generated by the dead reckoning sensor 11 may have accumulated errors. To obtain more accurate localization and mapping results, the original pose may be corrected. In the present disclosure, the correction of the original pose may be based on the image acquired by the visual sensor 12.

The visual sensor 12 may be configured to acquire images of the surrounding environment based on an acquisition period set by the controller 13. The images acquired by the visual sensor 12 and the original pose generated or obtained by the dead reckoning sensor 11 may be transmitted to the controller 13. The controller 13 may correct the original pose generated by the dead reckoning sensor 11 based on the images acquired by the visual sensor 13, and may further perform localization and mapping based on the corrected pose.

In this embodiment, the original pose may be corrected based on the images acquired by the visual sensor 12, thereby realizing the localization and mapping. In addition, when this embodiment is implemented in a mobile device, VSLAM may be realized for the mobile device.

Figure 2:
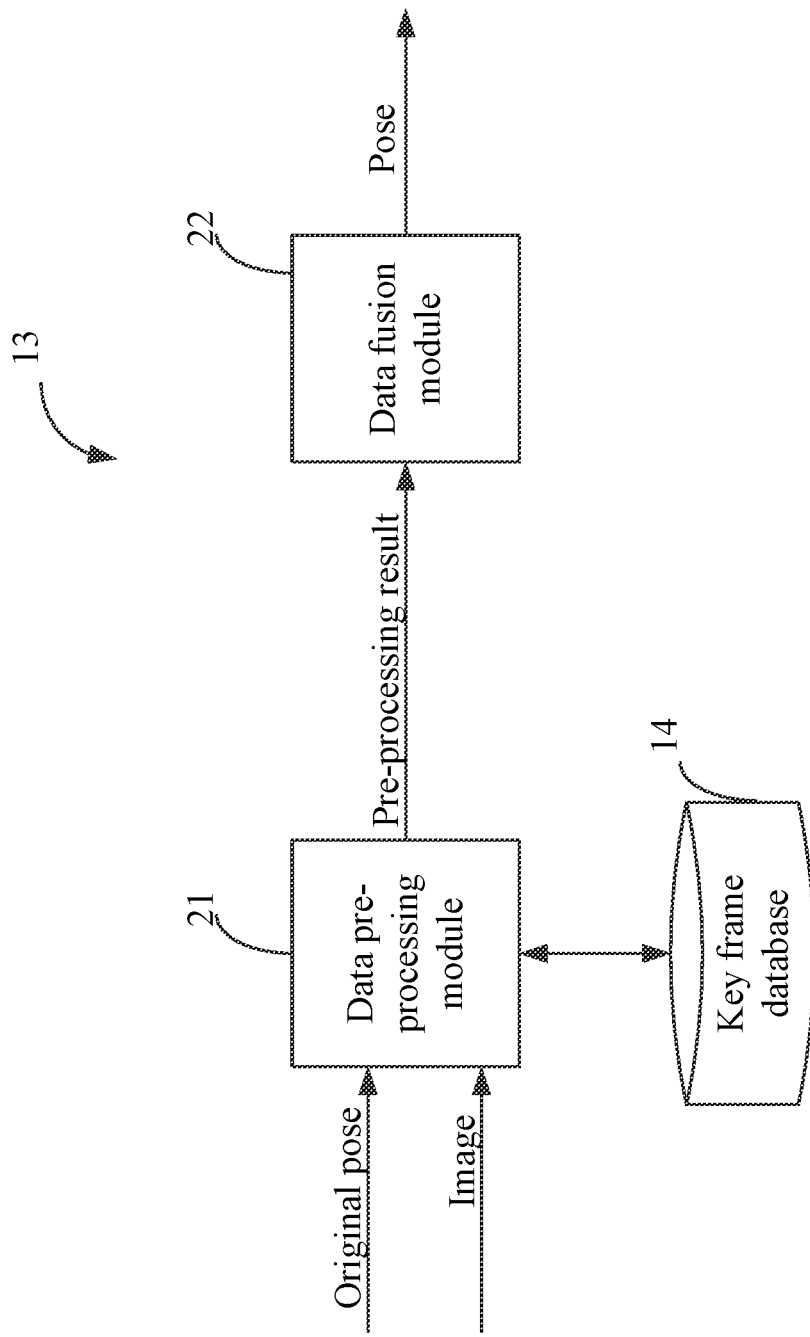
FIG. 2 is a schematic diagram of a structural configuration of a controller, according to an example embodiment.

FIG. 2 is a schematic diagram of a configuration of a controller, according to an embodiment of the present disclosure.

As shown in FIG. 2, the controller 13 may include a data pre-processing module 21 and a data fusion module 22.

The data pre-processing module 21 may be configured to receive the original pose transmitted from the dead reckoning sensor 11, and receive images transmitted from the visual sensor 12. After processing the original pose and the images, the data pre-processing module 21 may obtain a dead reckoning based relative pose, a visual relative pose, a new key frame identification, a node identification, and their relevant information, which together may form a pre-processing result. The node identification may include: a new node identification and/or an associated node identification. The data fusion module 22 may perform localization and mapping based on the pre-processing result. It should be understood that the dead reckoning based relative pose and its relevant information may be computed by the data fusion module 22. In such a situation, the data pre-processing module 21 may provide the original pose to the data fusion module 22. The data pre-processing module 21 may not perform computation of the dead reckoning based relative pose and its relevant information. Instead, the data fusion module 22 may perform the computation.

The data fusion module 22 may record an absolute pose of each node, and may optimize the absolute pose of the node based on the visual relative pose. As described above, a node may include information indicating a pose of the mobile device at a specific time instance. The data fusion module 22 may use the optimized absolute pose of a current node as a localization result of the current node, thereby accomplishing localization. The node may be a key frame node or a pose node. The key frame node refers to the situation where when a node is created, a key frame is also created. The pose node refers to the situation where when a node is created, a key frame is not also created. An absolute pose of a node that has been optimized and recorded at the back end can be interpreted as map information, thereby accomplishing mapping.

The key frame database 14 may be configured to store key frames. Depending on different current situations, the number of key frames stored in the key frame database 14 may be 0, 1, or multiple. The key frame may be created or constructed based on an image (e.g., a first image) acquired by the visual sensor 12. The detailed content of the key frame may refer to the above explanation of the terminologies.

Figure 3:
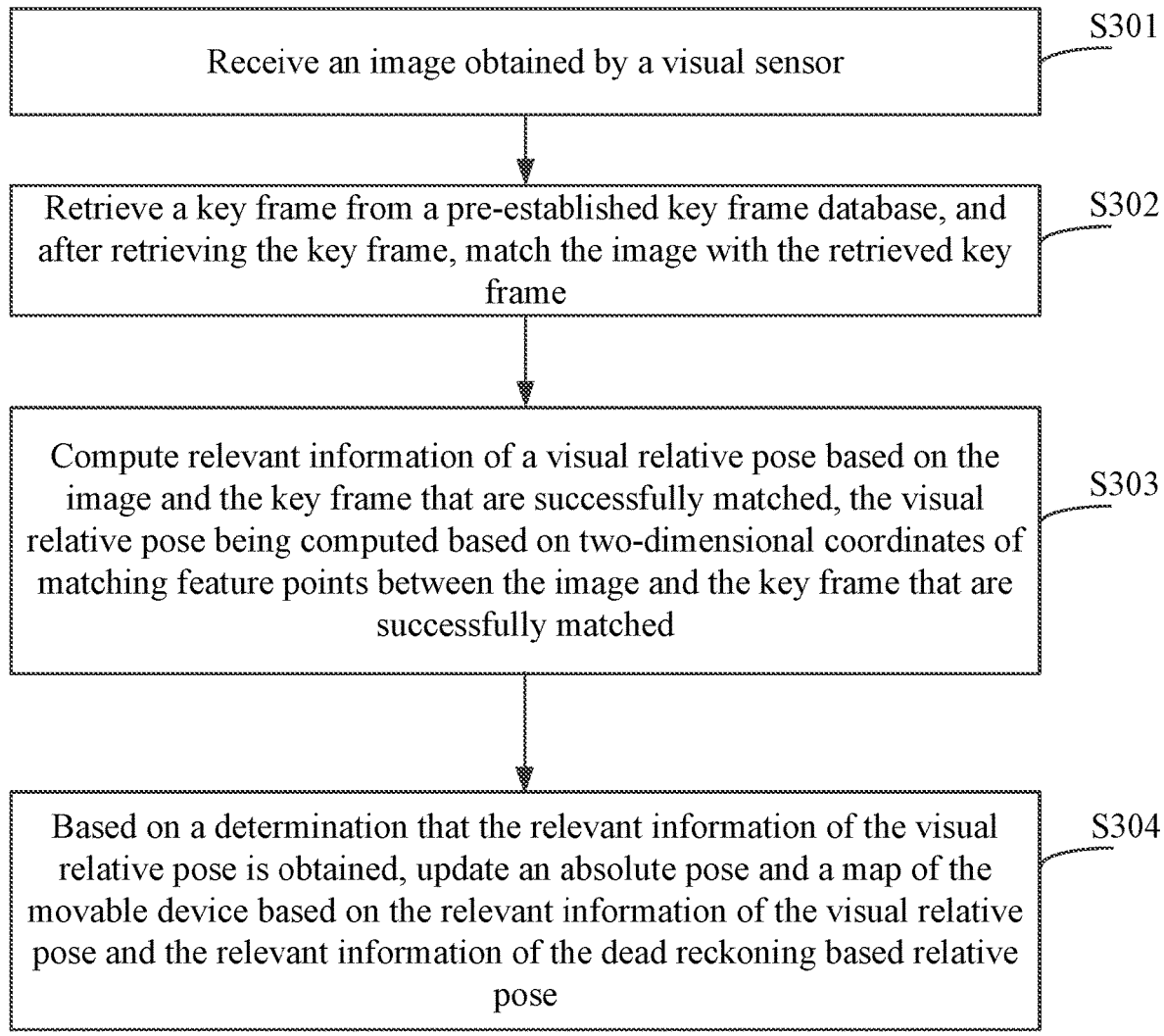
FIG. 3 is a flow chart illustrating a method of localization and mapping, according to an example embodiment.

FIG. 3 is a flow chart illustrating a method of localization and mapping (e.g., autonomous or semi-autonomous) based on SLAM technology (e.g., the VSLAM technology disclosed herein), according to an embodiment of the present disclosure. The method may be executed by the controller 13.

As shown in FIG. 3, the method may include:

S301: receiving an image obtained by a visual sensor. The image may be referred to as a second image. For convenience, an image used to create the key frame may be referred as a first image.

S302: retrieving a key frame from a pre-established key frame database, and after retrieving the key frame, matching the image (e.g., the second image) with the retrieved key frame (i.e., comparing the image with the retrieved key frame to determine whether there is a match between feature points included in the image and the key frame).

S303: computing relevant information of a visual relative pose based on the image and the key frame that are successfully matched, the visual relative pose being computed based on two-dimensional coordinates of matching feature points between the image and the key frame that are successfully matched.

S304: based on a determination that the relevant information of the visual relative pose is obtained, updating an absolute pose and a map of the mobile device based on the relevant information of the visual relative pose and the relevant information of the dead reckoning based relative pose.

On the other hand, based on a determination that the relevant information of the visual relative pose cannot be or is not obtained through computing the relevant information of the visual relative pose, the absolute pose of the mobile device at the most recent time instance may be updated based on the relevant information of the dead reckoning based relative pose.

In addition, it can be understood, that the method may further include:

receiving an original pose obtained by the dead reckoning sensor 11; or receiving motion data obtained by the dead reckoning sensor 11, and computing the original pose based on the motion data; and computing the relevant information of the dead reckoning based relative pose based on the original pose.

It can be understood that there is no time sequence limiting relationship between the above steps, so long as parameters needed for current computation have been received and/or computed prior to the current computation.

In a specific implementation, matching the image and the key frame, and computing the visual relative pose and its corresponding covariance matrix may be executed by the data pre-processing module 21 of the controller 13. Updating the absolute pose and/or the map of the mobile device based on the pre-processing result may be executed by the data fusion module 22 of the controller 13. The detailed processing flow of the data pre-processing can refer to FIG. 4, and the detailed processing flow of the data fusion can refer to FIG. 8.

In this embodiment, when computing the visual relative pose, by adopting two-dimensional coordinates of the feature points that match with one another, rather than the three-dimensional coordinates of the spatial point(s) corresponding to the feature points, various limitations associated with computing the three-dimensional coordinates may be avoided, thereby increasing the success rate of computing the visual relative pose, and further improving the accuracy of the ultimate localization and mapping result and computation speed.

Because the data pre-processing module 21 is primarily configured to process vision information, operations involving the dead reckoning based relative pose and its relevant information are relatively simple, which are not repeated, and a suitable method adopted in relevant technology can be implemented. In addition, the dead reckoning based relative pose and its relevant information may be obtained by the data fusion module 22 based on the original pose.

Figure 4:
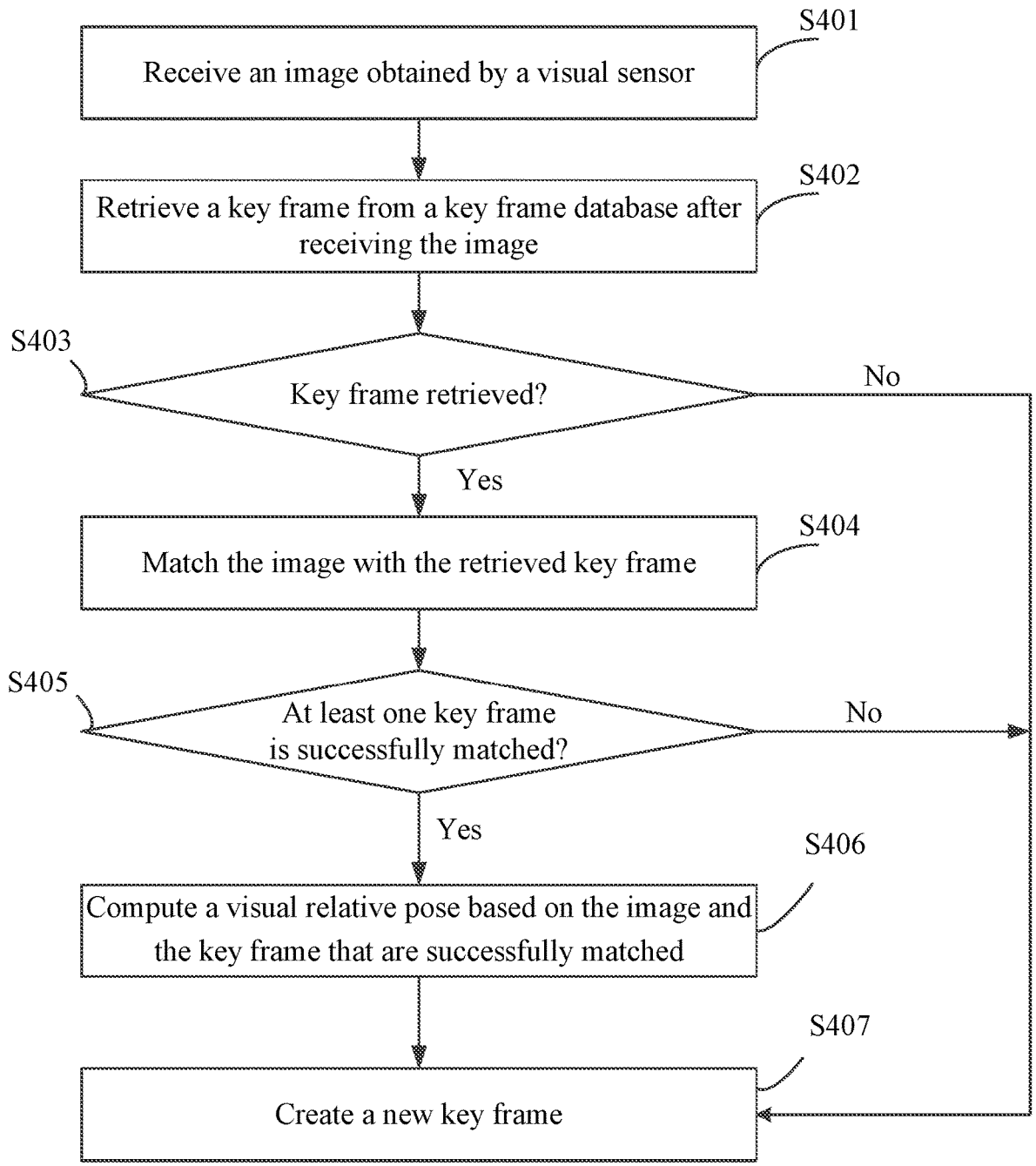
FIG. 4 is a flow chart illustrating processes of data pre-processing, according to an example embodiment.

FIG. 4 is a flow chart illustrating processes for data pre-processing, according to an embodiment of the present disclosure.

As shown in FIG. 4, the processes of the data pre-processing may include:

S401: receiving an image from a visual sensor.

S402: retrieving a key frame from a key frame database after receiving the image.

In some embodiments, the key frame database may be configured to store one or more key frames. At a current instance, the key frame database may include a key frame, or may be empty (or not have a key frame stored therein).

S403: determining whether the key frame is retrieved. If Yes, S404 may be executed; otherwise (if No), S407 may be executed.

S404: matching the image with the retrieved key frame.

In some embodiments, image data of the key frame may include information of feature points of the key frame.

During the matching, feature points of the image may be extracted to obtain information of the feature points of the image. The matching may be performed based on the information of the feature points of the image and the information of the feature points of the key frame to determine matching feature points included in both of the image (e.g., the second image) and the key frame. When the number of feature points that are matched with one another (i.e., the number of matching feature points) is greater than or equal to a matching threshold value, it may be determined that the image and the key frame have been successfully matched. In some embodiments, the matching threshold value may be a predetermined threshold value.

The information of a feature point may include at least one of: two-dimensional coordinates of the feature point in the pixel coordinate system or a descriptor of the feature point. For example, in some embodiments, the information of the feature point may include the two-dimensional coordinates of the feature point in the pixel coordinate system and the descriptor of the feature point.

Various relevant technologies may be used to realize the extraction of the feature points. For example, the feature points may be extracted based on at least one of a Scale-invariant Feature Transform ("SIFT") algorithm, a Speeded Up Robust Features ("SURF") algorithm, or an Oriented FAST and Rotated BRIEF ("ORB") algorithm, etc.

After the information of the feature points of the image and the information of the feature points of the key frame are obtained, the feature points in the image and the key frame may be matched. The match operation for the feature points may be realized using various relevant technologies. For example, in one embodiment, a search scope may be determined based on the original pose corresponding to the image and the two-dimensional coordinates of the feature points. A vector distance may be calculated based on the descriptors within the search scope. Feature points that match with one another may be determined based on the vector distance.

S405: determining whether there is at least one key frame that is successfully matched with the image. If Yes, S406 may be executed; otherwise, if No, S407 may be executed.

In some embodiments, a different key frame may be retrieved from the key frame database each time, to match with the image (i.e., compare with the image to determine if they match), until all of the key frames stored in the key frame database have been retrieved to match with the image, thereby determining whether there is at least one key frame that is successfully matched with the image.

S406: computing a visual relative pose based on the image and the key frame that are successfully matched.

In some embodiments, the visual relative pose may be computed based on two-dimensional coordinates of the matching feature points included in the image and the key frames that have been successfully matched.

Based on a predetermined reasonableness condition (described below), the visual relative pose may be deemed as reasonable or unreasonable (or not reasonable). Examples of the reasonableness condition and the determination of whether a visual relative pose is reasonable or unreasonable are described below in step S505. Specifically, when the visual relative pose is reasonable, a covariance matrix of the visual relative pose and two node identifications associated with the visual relative pose may be obtained. Therefore, when the visual relative pose is reasonable, the visual relative pose and its covariance matrix, and the current node identification and an associated node identification may be treated as the relevant information of the visual relative pose, and may be used as parts of the pre-processing results. When all of the visual relative poses obtained through computation are not reasonable, the pre-processing results may not include the relevant information of the visual relative pose.

The above-described two node identifications may include a current node identification and an associated node identification. In some embodiments, an identification of an image and an identification of a key frame corresponding to the visual relative pose may be used as the current node identification and the associated node identification, respectively. A covariance matrix may be pre-configured with an image identification. Because the key frame is created based on an image, an identification of the key frame may be the same as the image identification of the image based on which the key frame is created. Therefore, the above-described current node identification may be selected to be the image identification of the current image. The above-described associated node identification may be, for example, the image identification of the key frame that is successfully matched with the image and that can be used to compute a reasonable visual relative pose. For example, if an image of a first identification and a key frame of a second identification are matched successfully and can be used to compute a reasonable visual relative pose, then the current node identification may be the first identification, and the associated node identification may be the second identification.

Figure 5:
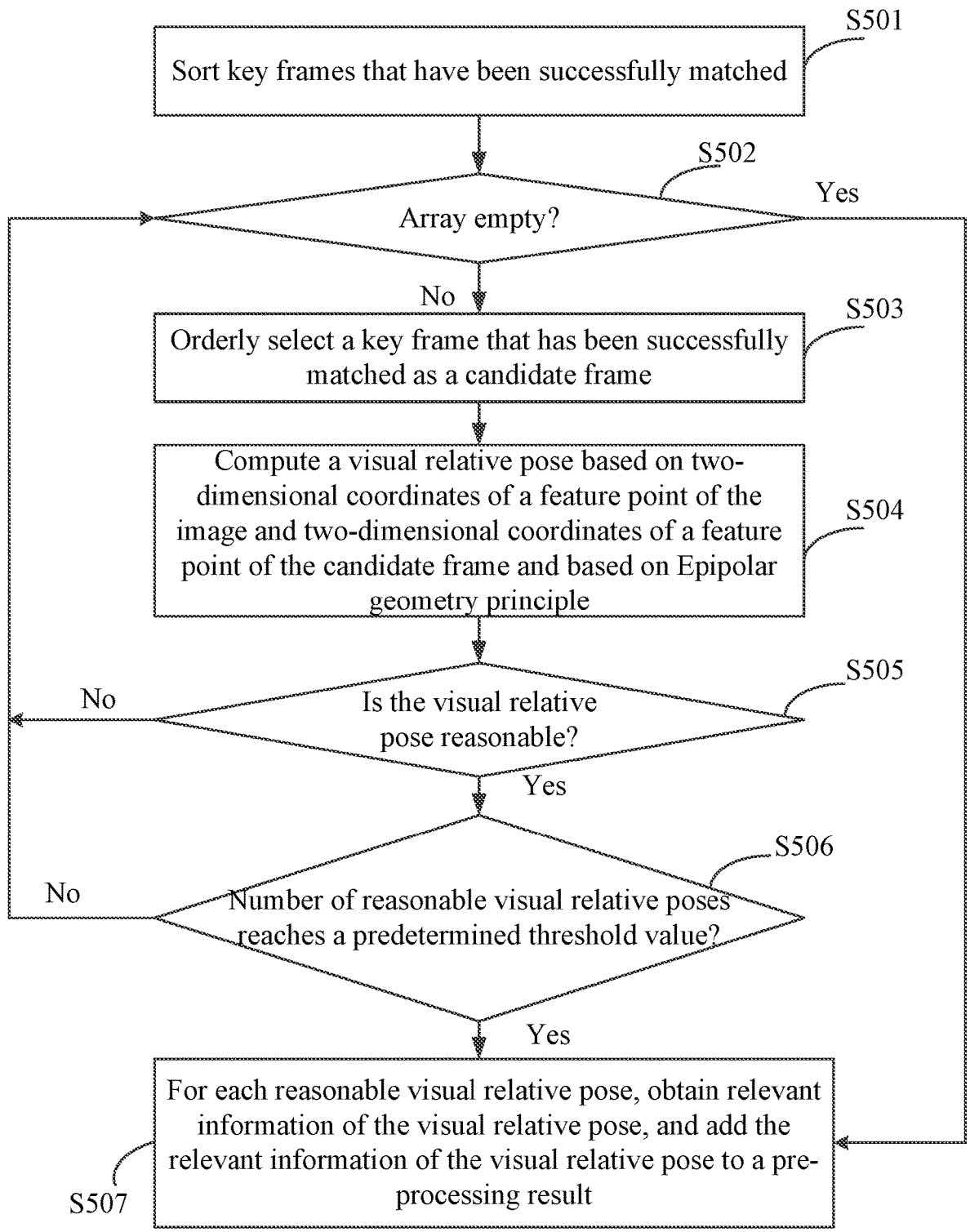
FIG. 5 is a flow chart illustrating processes of computing a visual relative pose, according to an example embodiment.

The detailed content of the computation of the visual relative pose based on the image and the key frame may refer to FIG. 5.

S407: creating a new key frame.

Figure 7:
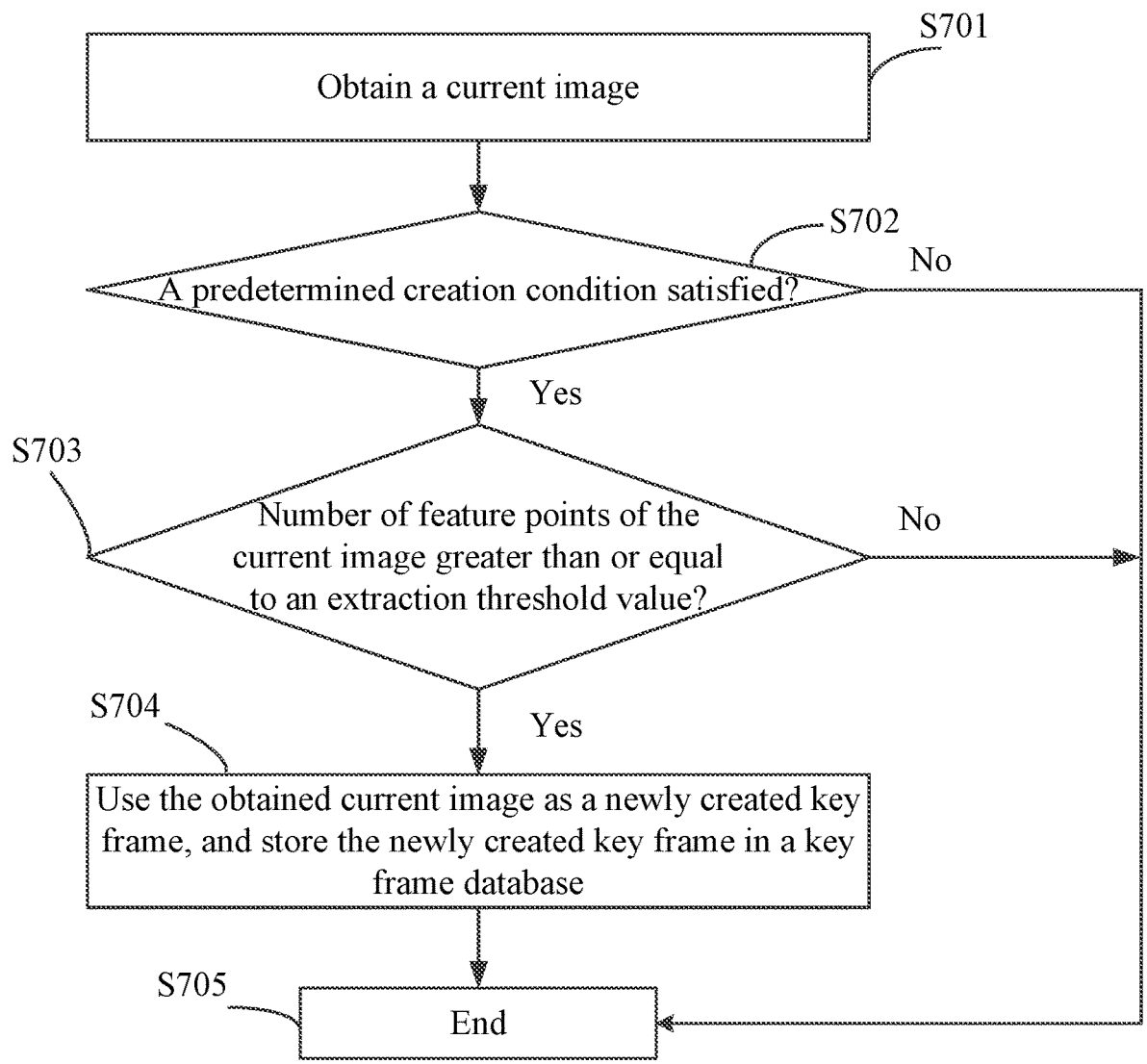
FIG. 7 is a flow chart illustrating processes for creating a key frame, according to an example embodiment.

The detailed process for creating the key frame can refer to FIG. 7.

In this embodiment, by performing the computation of the visual relative pose and the dead reckoning based relative pose at the data pre-processing module 21, the pre-processing results can be provided to the data fusion module 22 for localization and/or mapping. By using two-dimensional coordinates when computing the visual relative pose, issues associated with computing three-dimensional coordinates can be avoided, thereby obtaining constraint information provided by the vision in a convenient, accurate, and fast manner.

FIG. 5 is a flow chart illustrating processes for computing the visual relative pose, according to an embodiment of the present disclosure.

As shown in FIG. 5, the processes for computing the visual relative pose may include:

S501: sorting key frames that have been successfully matched.

In some embodiments, the key frames that have been successfully matched may be sorted based on a similarity between the key frames and the image that have been successfully matched.

The similarity may be computed based on the BoW algorithm.

For example, first, a bag of words may be trained. An image feature vector of the image and an image feature vector of the key frame may be generated based on the trained bag of words. A distance between the image feature vector of the image and the image feature vector of the key frame may be computed. The smaller the distance, the higher the similarity. When sorting the key frames, the key frames may be sorted based on the distance in an order from small to large.

In some embodiments, when training the bag of words, a large amount of pre-collected descriptors of feature points may be clustered into a fixed number of clusters. Each cluster may be referred to as a word. The inverse document frequency ("idf") of the word may be computed based on a statistical method, as the weight of the word. The bag of words may include the words and their corresponding weights. When generating an image feature vector based on the bag of words, a length of the vector may be a quantity (or number) of the words included in the bag of words. Each element in the vector is the term frequency-inverse document frequency ("tf-idf") of the corresponding word appeared in the current image.

S502: determining whether an array is empty. If it is empty (Yes), S507 may be executed; otherwise, if No, S503 may be executed.

In some embodiments, the array may be configured to store the sorted key frames that have been successfully matched. When a key frame is to be retrieved from the array, the key frame that has been successfully matched may be retrieved in an order of similarity from large to small. After the key frame is retrieved, the key frame no longer exists in the array.

S503: orderly selecting a key frame that has been successfully matched as a candidate frame.

S504: computing a visual relative pose based on two-dimensional coordinates of a feature point of the image and two-dimensional coordinates of a feature point of the candidate frame and based on Epipolar geometry principle.

For example, based on two-dimensional coordinates of feature points that match with one another, a basic matrix may be computed based on a seven-point method or an eight-point method of Epipolar geometry. If the internal parameters of the video camera are known, the basic matrix may be decomposed through a matrix decomposition method, to obtain the visual relative pose. Alternatively, if an essential matrix is obtained based on a five-point method, then the internal parameters of the video camera need not be known. The essential matrix may be decomposed to obtain the visual relative pose.

For example, as shown in FIG. 6, when a mobile device 61 carrying a camera 62, such as a cleaning robot, moves in a two-dimensional plane (XOY), the pose of the mobile device may be represented by (x, y, θ). The visual relative pose to be computed may be represented by (Δα,Δθ), where, $\Delta\alpha = \arcsin(\Delta y / \sqrt{(\Delta x^2 + \Delta y^2)})$.

Assuming that the two-dimensional coordinates of a group of feature points that match with one another are represented by:

$$(u_i, v_i, 1)^T, (u'_i, v'_i, 1)^T,$$

then the following equation may exist in an ideal situation:

$$[u_i \ v_i \ 1] K^{-T} \begin{bmatrix} 0 & 0 & \sin\Delta\alpha \\ 0 & 0 & -\cos\Delta\alpha \\ -\sin\Delta\alpha & \cos\Delta\alpha & 0 \end{bmatrix} \begin{bmatrix} \cos\Delta\theta & -\sin\Delta\theta & 0 \\ \sin\Delta\theta & \cos\Delta\theta & 0 \\ 0 & 0 & 1 \end{bmatrix} K^{-1} [u'_i \ v'_i \ 1] = 0, \quad (1)$$

where K represents an internal parameter matrix of the camera.

For given multiple groups of matching feature points, multiple equations (1) may exist corresponding to the multiple groups. The multiple equations may be optimized to be as close to 0 as possible. As a result, the visual relative pose (Δα,Δθ) may be obtained.

The above descriptions use the movement of the mobile device in a two-dimensional space as an example. It can be understood that based on the above computational principles, a visual relative pose when the mobile device moves in a three-dimensional space may also be computed. The pose of the mobile device, which may be a mobile robot, may be represented by (x, y, z, φ, ψ, θ), and the visual relative pose to be computed may be represented by (Δα, Δβ,Δφ, Δψ, Δθ), where $\Delta\alpha = \arcsin(\Delta y / \sqrt{(\Delta x^2 + \Delta y^2)})$, and $\Delta\beta = \arcsin(\Delta z / \sqrt{(\Delta x^2 + \Delta y^2 + \Delta z^2)})$.

Assuming the two-dimensional coordinates of a group of feature points that match with one another are represented by: $(u_i, v_i, 1)^T, (u'_i, v'_i, 1)^T$, then the following equation may exist in an ideal situation:

$$[u_i \ v_i \ 1] K^{-T} \begin{bmatrix} 0 & -\sin\Delta\beta & \cos\Delta\beta\sin\Delta\alpha \\ \sin\Delta\beta & 0 & -\cos\Delta\beta\cos\Delta\alpha \\ -\cos\Delta\beta\sin\Delta\alpha & \cos\Delta\beta\cos\Delta\alpha & 0 \end{bmatrix} \quad (2)$$

$$R(\Delta\phi, \Delta\psi, \Delta\theta) K^{-1} [u'_i \ v'_i \ 1] = 0, \text{ where,}$$

$$R(\Delta\phi, \Delta\psi, \Delta\theta) = \begin{bmatrix} \cos\Delta\theta\cos\Delta\psi - \sin\Delta\theta\sin\Delta\phi\sin\Delta\psi & -\sin\Delta\theta\cos\Delta\phi & \cos\Delta\theta\sin\Delta\psi + \sin\Delta\theta\sin\Delta\phi\cos\Delta\psi \\ \sin\Delta\theta\cos\Delta\psi + \cos\Delta\theta\sin\Delta\phi\sin\Delta\psi & \cos\Delta\theta\cos\Delta\phi & \sin\Delta\theta\sin\Delta\psi - \cos\Delta\theta\sin\Delta\phi\cos\Delta\psi \\ -\cos\Delta\phi\sin\Delta\psi & \sin\Delta\phi & \cos\Delta\phi\cos\Delta\psi \end{bmatrix},$$

and where K represents the internal parameter matrix of the camera.

For given multiple groups of feature points that match with one another, there may be multiple equations (2) corresponding to the multiple groups. The multiple equations may be optimized to be as close to 0 as possible through an optimization. As a result, the visual relative pose represented by (Δα,Δβ,Δφ, Δψ, Δθ) may be obtained.

Defining:

$$X = (\Delta\alpha, \Delta\beta, \Delta\phi, \Delta\psi, \Delta\theta),$$

$$\Theta = (u_i, v_i, u'_i, v'_i),$$

then equation (2) may be expressed as:

$$F(X, \Theta) = \sum_i^n \frac{1}{2} (f_i(X, \Theta, K))^2,$$

where, $\Theta = (K, \Theta_1, \ldots, \Theta_i, \ldots, \Theta_n)$; and n is the number of groups of feature points that match with one another.

Based on the variance transfer rule, the covariance matrix of the visual relative pose may be computed based on the following equation:

$$\sum(X) = \left(\frac{\partial F^2(X, \Theta)}{\partial X}\right)^{-1} \left(\frac{\partial F^2(X, \Theta)}{\partial X \partial \Theta}\right)^T \sum(\Theta) \left(\frac{\partial F^2(X, \Theta)}{\partial X \partial \Theta}\right) \left(\frac{\partial F^2(X, \Theta)}{\partial X^2}\right)^{-T},$$

where, Σ(X) represents the covariance matrix of the visual relative pose, Σ(Θ) represents an empirical value, which is related to the camera parameter and the sensor noise.

It can be understood that the above-described computation method for computing the covariance matrix is only an illustrative method. In some embodiments, the covariance matrix may be approximately computed based on experience. For example, the covariance matrix may be set based on a number of feature points that match with one another. For example, in some embodiments, the more the matched feature points, the smaller the elements included in the covariance matrix, and vice versa.

There are also multiple computational methods for computing the dead reckoning based relative pose. One of the methods is introduced below:

Assuming a dead reckoning based relative pose is to be computed between time instance t1 and time instance t2, then time instance t1 may be used as a starting point, and time instance t2 may be used as a finishing point. The initial pose at the starting point may be set as 0. The dead reckoning based relative pose may be obtained by performing an integration of data of the dead reckoning sensor 11.

The covariance of the dead reckoning based relative pose may be computed based on the variance transfer rule. The entire computation process can refer to the process function of the Kalman filter.

S505: determining whether the visual relative pose is reasonable; if Yes, S506 may be executed; otherwise, if No, S502 and steps following S502 may be repeatedly executed.

In some embodiments, a reasonableness condition may be pre-configured (or predetermined). When the visual relative pose satisfies the predetermined reasonableness condition, it indicates that the visual relative pose is reasonable; otherwise, the visual relative pose is unreasonable (or not reasonable).

The predetermined reasonableness condition may include, for example: a reprojection error of the image computed based on the visual relative pose is smaller than a predetermined error value. Specifically, for example, after the visual relative pose is computed, the visual relative pose may be substituted into the above multiple equations (1). If a difference between the overall value of the multiple equations and 0 is smaller than a predetermined threshold value, it indicates that the obtained visual relative pose is reasonable. The above-described overall value may be computed based on the multiple equations, for example, based on an average value or other suitable computation method. The predetermined reasonableness condition may be determined based on the current covariance matrix. For example, if the current covariance matrix indicates that the current visual relative pose is reliable (e.g., values of the covariance matrix is smaller than a predetermined value), it means that the current visual relative pose is reasonable. The covariance matrix may be determined based on information such as noise of the dead reckoning sensor 11, an abnormal behavior of the mobile device, such as slippage.

S506: determining whether the number of reasonable visual relative poses reaches a predetermined threshold number. If Yes, S507 may be executed; otherwise, if No, S502 and steps following S502 may be repeatedly executed.

For example, in some embodiments, at the beginning, the initial value of the number of reasonable visual relative poses may be set as 0. Whenever a reasonable visual relative pose is computed, the number may be increased by 1. When the number is smaller than the predetermined threshold number, it indicates that the predetermined threshold value has not been reached. When the number equals to the predetermined threshold number, it indicates that the predetermined threshold value has been reached.

S507: for each reasonable visual relative pose, obtaining relevant information of the visual relative pose, and adding the relevant information of the visual relative pose to a pre-processing result.

The relevant information of the visual relative pose may include at least one of: a covariance matrix of the visual relative pose, or two node identifications associated with the visual relative pose. For example, in some embodiments, the relevant information of the visual relative pose may include a covariance matrix of the visual relative pose, and two node identifications associated with the visual relative pose, etc. The detailed content of the relevant information may refer to the relevant content associated with S406, which is not repeated.

It should be noted that the number of reasonable visual relative poses may be one or multiple, and the pre-processing result may include one or multiple groups of relevant information of visual relative pose. Each group of relevant information may correspond to a reasonable visual relative pose. Specifically, in some embodiments, each group of relevant information may include a visual relative pose and its covariance matrix, the current node identification and the associated node identification. Further, in some embodiments, if there are multiple reasonable visual relative poses, because the multiple reasonable visual relative poses correspond to a same current node identification, each group of relevant information may include the current node identification. Alternatively, each group of relevant information may not include the current node identification. Rather, the multiple groups of relevant information may share the current node identification. For example, if there are two reasonable visual relative poses, the pre-processing result may adopt one or both of the following forms:

Form one: a first visual relative pose, a covariance matrix of the first visual relative pose, a current node identification, a first associated node identification; a second visual relative pose, a covariance matrix of the second visual relative pose, the current node identification, a second associated node identification; or Form two: a current node identification; a first visual relative pose, a covariance matrix of the first visual relative pose, a first associated node identification; a second visual relative pose, a covariance matrix of the second visual relative pose, a second associated node identification.

When there is no reasonable visual relative pose, the computation of the visual relative pose may be terminated. The pre-processing result may not include relevant information of the visual relative pose. In some embodiments, if the data pre-processing module 21 is configured to compute relevant information of the dead reckoning based relative pose, then the pre-processing result may include the relevant information of the dead reckoning based relative pose; otherwise, if the data pre-processing module 21 is not configured to compute the relative information of the dead reckoning based relative pose, the pre-processing result may include the original pose.

In this embodiment, by computing the visual relative pose based on the key frame that has a high similarity, the accuracy and efficiency can be improved.

FIG. 7 is a flow chart illustrating processes for creating a key frame, according to an embodiment of the present disclosure.

As shown in FIG. 7, the processes for creating the key frame may include:

S701: obtaining a current image.

For example, an image currently received from the visual sensor 12 may be used as the current image.

S702: determining whether a predetermined creation condition is satisfied; if Yes, S703 may be executed; otherwise, if No, S705 may be executed.

The creation condition may be set or configured based on actual needs. For example, a predetermined time difference since the last creation of a key frame may be set. When a time difference since the last creation of a key frame reaches the predetermined time difference, creation of a key frame may be triggered. Alternatively, the triggering condition may be configured based on the original pose obtained by the dead reckoning sensor 11. For example, when the dead reckoning based relative pose computed based on the original pose is greater than a predetermined threshold value, the creation of the key frame may be triggered. Alternatively or additionally, the creation of the key frame may be triggered based on the current operation status of the mobile device. For example, the creation of the key frame may be triggered based on a turn of the mobile device. Alternatively or additionally, the creation of the key frame may be triggered based on an overlapping region of two consecutively acquired images. For example, when a ratio of the overlapping region over the entire image region is smaller than a predetermined value, the key frame creation may be triggered.

S703: determining whether the number of feature points of the current image is greater than or equal to an extraction threshold value; if Yes, S704 may be executed; otherwise, if No, S705 may be executed.

The process for extracting a feature point can refer to the above descriptions, which are not repeated here. Through the feature point extraction, two-dimensional coordinates of the feature point in the pixel coordinate system and a descriptor of the feature point may be obtained.

In some embodiments, the extraction threshold value may be a predetermined or pre-configured threshold value.

S704: when creation of the key frame is successful, using the obtained image as a newly created key frame and storing the newly created key frame in a key frame database.

In addition, when the creation of the key frame is successful, the current node identification may be output to the data fusion module 22. The current node identification may be selected to be an image identification of the newly created key frame. Further, a key frame identification may be included in information output to the data fusion module 22, which indicates that the key frame has been created.

It should be noted that after the feature point is extracted from the current image, the two-dimensional coordinates of the feature point and the descriptor of the feature point may be obtained. The key frame stored in the key frame database may also include: an absolute pose of the mobile device in the global coordinate system when the current image is captured or acquired. The absolute pose may be computed based on an absolute pose corresponding to a previous or preceding image or key frame, and a dead reckoning based relative pose corresponding to a time interval between the previous or preceding image or key frame and the current image. A correspondence relationship in times between images and the original poses may be aligned using the following method: assuming the shooting time of an image is t0, then the original poses at two time instances t1 and t2 that are closest to the time instance t0 may be obtained. An interpolation computation may be performed on the original pose at time instance t1 and the original pose at time instance t2 to obtain an interpolated original pose. A corresponding dead reckoning based relative pose may be computed based on the original pose corresponding to the preceding image or key frame and the original pose corresponding to the current image. An absolute pose of the current image is a sum of an absolute pose corresponding to the preceding image or key frame and the dead reckoning based relative pose. Subsequent optimization and updating of the absolute pose of the image can be performed.

S705: ending the processes.

In this embodiment, by extracting and storing two-dimensional coordinates of the feature point when creating the key frame, there is no need to compute three-dimensional coordinates of a spatial point corresponding to the feature point, thereby avoiding issues caused by computing the three-dimensional coordinates. As a result, the quantity (or number) of the key frames included in the key frame database can be increased. Furthermore, the matching success rate between the images and the key frames may be improved, and the effect of the localization and mapping can be improved.

Figure 8:
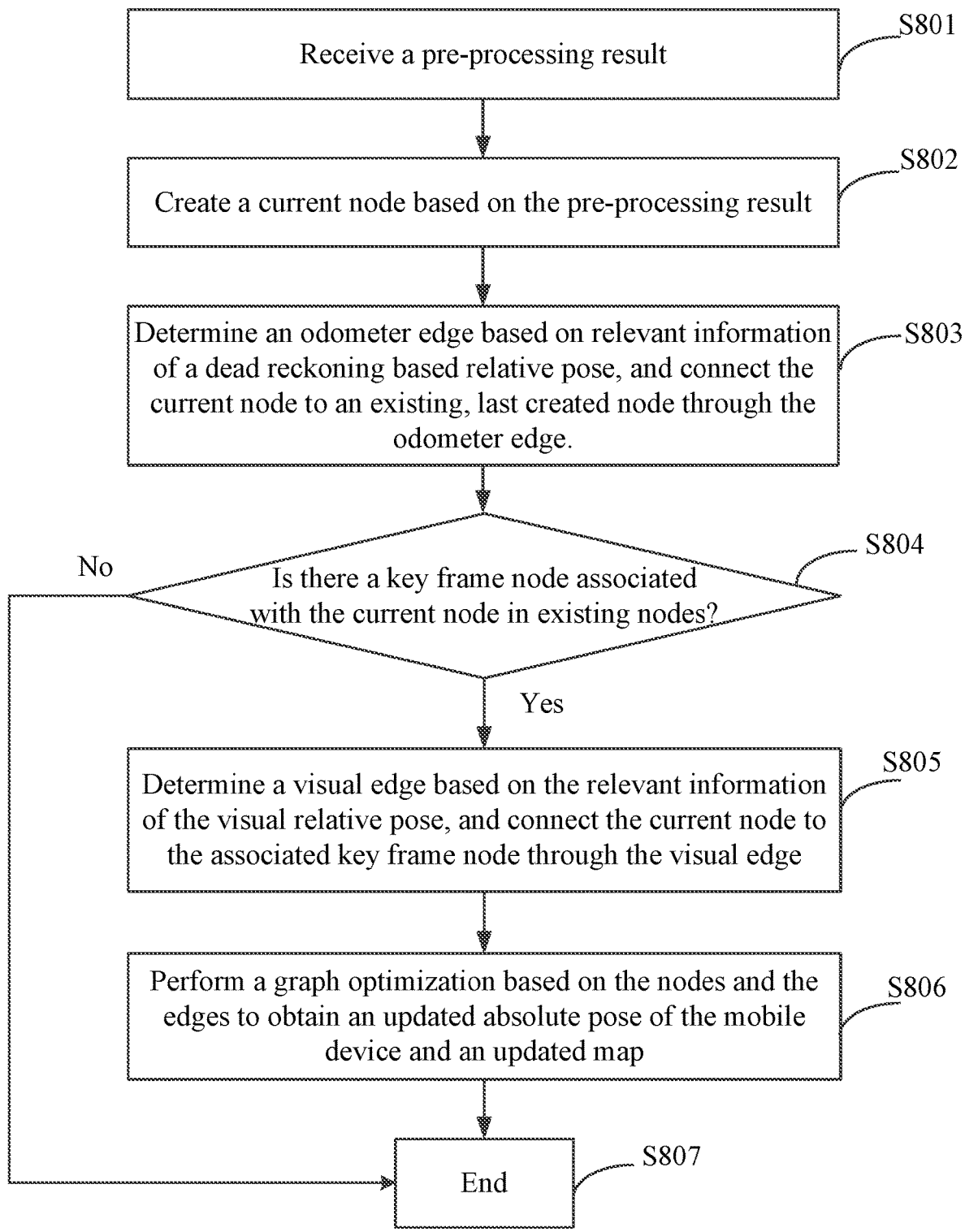
FIG. 8 is a flow chart illustrating processes for data fusion, according to an example embodiment.

The data fusion can be performed based on a filtering based method or a non-linear optimization based method. The non-linear optimization based method is used as an example in the following description to illustrate an example of the technical solutions. FIG. 8 is a flow chart illustrating processes for data fusion, according to an embodiment of the present disclosure.

As shown in FIG. 8, the processes performed by the data fusion module 22 may include:

S801: receiving a pre-processing result.

In some embodiments, if the data pre-processing module 21 is configured to compute the relevant information of the dead reckoning based relative pose, then the pre-processing result may include at least one of: a dead reckoning based relative pose, or a covariance matrix of the dead reckoning based relative pose. For example, in some embodiments, the pre-processing result may include the dead reckoning based relative pose and the covariance matrix of the dead reckoning based relative pose. The covariance matrix of the dead reckoning based relative pose may be determined based on sensor noise, abnormal behavior of the mobile device, etc.

When there is at least one key frame that is successfully matched, and when a reasonable visual relative pose is computed based on the successfully matched key frame, the pre-processing result may include at least one of: a dead reckoning based relative pose, a visual relative pose, a covariance matrix of the dead reckoning relative pose, a covariance matrix of the visual relative pose, or an associated node identification. For example, in some embodiments, the pre-processing result may include a dead reckoning based relative pose, a visual relative pose, a covariance matrix of the dead reckoning relative pose, a covariance matrix of the visual relative pose, and an associated node identification. Further, the pre-processing result may include at least one of a new key frame identification or a new node identification. For example, the pre-processing result may include the new key frame identification and the new node identification.

When a key frame creation condition is satisfied and a key frame is successfully created, the pre-processing result may include a new key frame identification. The new key frame identification indicates that the new key frame has been created.

S802: creating a current node based on the pre-processing result.

When the pre-processing result includes the new key frame identification and/or the new node identification, a new node may be created. The new node identification is a determination result of the data pre-processing module 21 determining whether to create a pose node based on a predetermined judging condition. The predetermined judging condition may include: whether at least one of a distance, an angle difference, or a time interval between a current original pose and an original pose of a last node (i.e., the existing, last created node) fall within or outside of a respective, predetermined threshold range.

In addition, when the new key frame identification indicates that the key frame has been successfully created, then the current node that has been created is a key frame node; otherwise, the current node that has been created is a pose node.

S803: determining an odometer edge based on relevant information of a dead reckoning based relative pose, and connecting the current node to an existing, last created node through the odometer edge.

In some embodiments, the data fusion module 22 may record an absolute pose of each node. The absolute pose at an initial time instance may be obtained by adding an absolute pose of a last node and a current dead reckoning based relative pose. After optimization, each node may include a value optimized based on the visual relative pose. That is, after optimization, the data fusion module 22 may record: an optimized absolute pose of each node.

S804: determining whether there is a key frame node associated with a current node in existing nodes; if Yes, S805 may be executed; otherwise, S807 may be executed.

In some embodiments, when the pre-processing result includes relevant information of the visual relative pose, an associated node identification may be obtained from the relevant information of the visual relative pose. When the existing nodes include a node indicated by the associated node identification, it may be determined that there exists a key frame node associated with the current node, and the associated key frame node is a node indicated by the associated node identification.

S805: determining a visual edge based on the relevant information of the visual relative pose, and connecting the current node to the associated key frame node through the visual edge.

S806: performing a graph optimization based on the nodes and the edges to obtain an updated absolute pose of the mobile device and an updated map.

Algorithms for the graph optimization may include a General (Hyper) Graph Optimization ("g2o"), a Ceres algorithm, etc. For example, when the g2o optimization algorithm is used, the input may include at least one of the absolute poses of all nodes, the relative poses between the nodes, or their covariance matrices. For example, in some embodiments, the input may include the absolute poses of all nodes, the relative poses between the nodes, and their covariance matrices. The output may include at least one of an optimized absolute pose of each node, or relative poses between the nodes including the visual relative poses and the dead reckoning based relative poses. For example, in some embodiments, the output may include an optimized absolute pose of each node and relative poses between the nodes including the visual relative poses and the dead reckoning based relative poses. In some embodiments, the optimized absolute pose of the current node may be used as a current localization result, i.e., an updated absolute pose of the mobile device at a current location. The optimized absolute pose of the key frame node may be understood as an updated map result, or updated absolute poses of the mobile device at various different locations.

S807: ending the processes.

In some embodiments, if the pre-processing result does not include the relevant information of the visual relative pose, then the graph optimization may not be performed. In some embodiments, only when the relevant information of the visual relative pose is included in the pre-processing result, the graph optimization may be performed after a closed loop is formed using one or more visual edges.

If the pre-processing result only includes the relevant information of the dead reckoning based relative pose, i.e., only includes the dead reckoning based relative pose and its covariance matrix, then an absolute pose of the mobile device at the most recent time instance may be updated based on the relevant information of the dead reckoning based relative pose. For example, the absolute pose of the mobile device at the most recent time instance may be determined as a sum of an absolute pose of the mobile device at the last time instance (i.e., preceding time instance) and the dead reckoning based relative pose.

In this embodiment, through the construction or creation of the points and edges and the graph optimization, updating of the absolute pose and/or the map may be performed quickly after the data fusion module 22 receives the relevant information of the visual relative pose.

In another embodiment, when the data fusion module 22 performs the processes based on a filtering method, the pre-processing result may be filtered, and the absolute pose and the map of the mobile device may be updated. In some embodiments, if the relevant information of the visual relative pose is obtained, then the pre-processing result may include at least one of the relevant information of the visual relative pose or the relevant information of the dead reckoning based relative pose. For example, in some embodiments, the pre-processing result may include the relevant information of the visual relative pose and the relevant information of the dead reckoning based relative pose.

Using the Kalman filter as an example, the filtering processes performed by the data fusion module 22 may be executed as follows:

It can be known from the above descriptions of the related contents of the above-described embodiments, that when the Kalman filter is used, the recursive equations involved in the filtering may include:

$$\hat{x}_{\bar{k}} = A\hat{x}_{k-1} + Bu_k,$$

$$P_{\bar{k}} = AP_{k-1}A^T + Q,$$

$$K_k = P_{\bar{k}}H^T(HP_{\bar{k}}H^T + R)^{-1},$$

$$\hat{x}_k = \hat{x}_{\bar{k}} + K_k(z_k - H\hat{x}_{\bar{k}}),$$

$$P_k = (I - K_kH)P_{\bar{k}}.$$

Specifically, during localization of the mobile device, assuming that the current time instance is the k-th time instance, then the absolute pose of the mobile device at the current time instance that is to be solved is represented by the above state vector $\hat{x}_k$. The state vector $\hat{x}_k$ is typically a vector formed by N elements. The i-th element may be an absolute pose of the mobile device at the (k−N+i)-th time instance. N may be a predetermined number. During the recursive computation, $\hat{x}_{k-1}$ is substituted with an absolute pose of the mobile device prior to updating the absolute pose, $z_k$ is substituted with a visual relative pose, $u_k$ is substituted with a dead reckoning based relative pose, Q is substituted with the covariance matrix of the dead reckoning based relative pose, and R is substituted with the covariance matrix of the visual relative pose.

Therefore, the absolute pose of the mobile device may also be updated through the filtering method, thereby accomplishing localization and/or mapping.

None of the steps of the disclosed methods involves computing three-dimensional coordinates of a spatial point corresponding to the feature point, which can avoid various limitations on the computation of the three-dimensional coordinates in existing computing technologies. As a result, the accuracy of the ultimate localization and mapping results and the computation speed can be improved.

Figure 9:
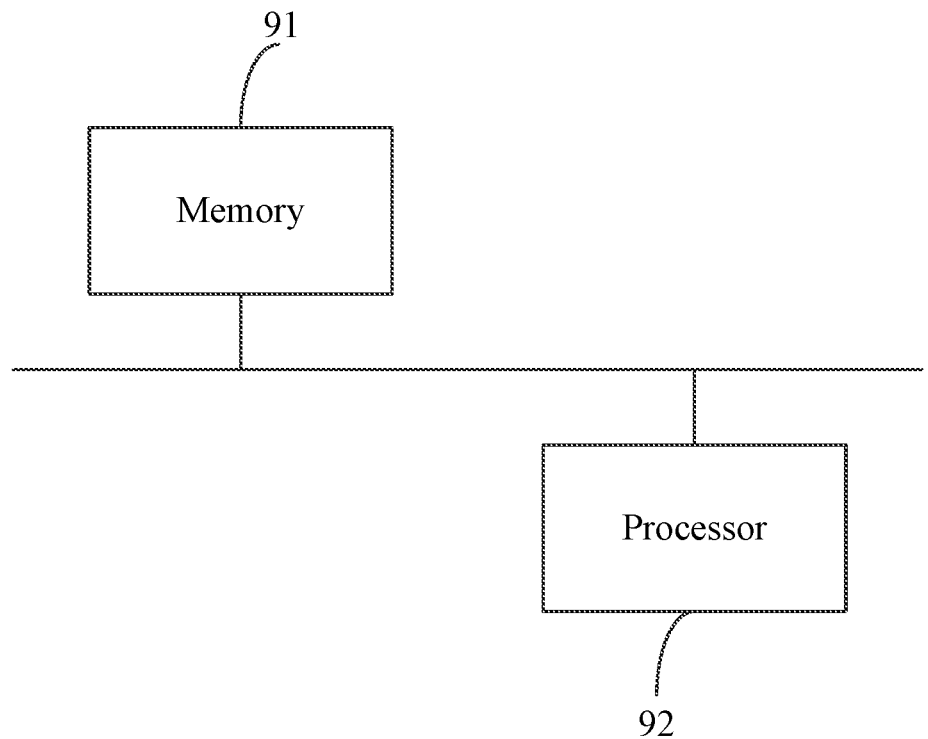
FIG. 9 is a schematic diagram of a structural configuration of a controller, according to an example embodiment.

FIG. 9 is a schematic diagram of a structure of a controller, according to an embodiment of the present disclosure. The controller shown in FIG. 9 may be an embodiment of the controller 13 shown in FIG. 1.

As shown in FIG. 9, the controller may include: a memory 91 and a processor 92. The memory 91 may be configured to store executable instructions. When the instructions stored in the memory 91 are executed by the processor 92, the above-disclosed method based on the disclosed VSLAM technology may be executed by the processor 92.

Embodiments of the present disclosure also provide a non-transitory computer-readable storage medium configured to store computer-executable instructions. When the computer-executable instructions stored in the storage medium are executed by the controller 13 of the mobile device or a processor, the computer-executable instructions may be configured to cause the controller 13 or the processor to perform above-disclosed method based on the disclosed VSLAM technology.

Figure 10:
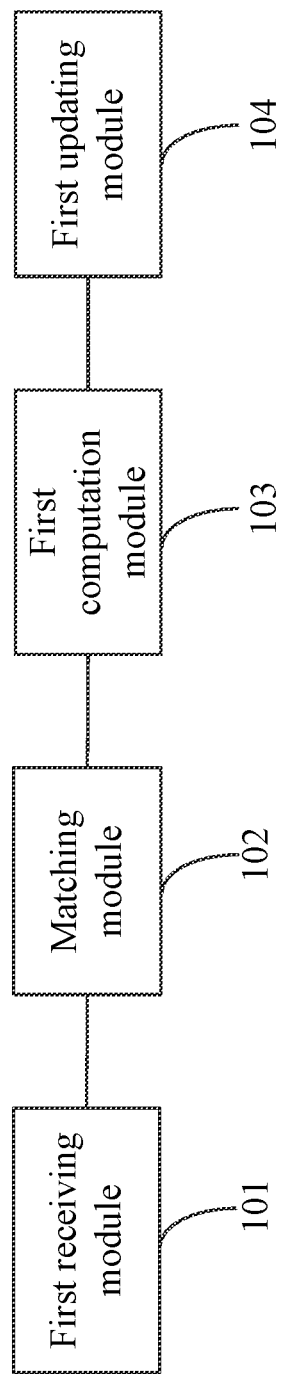
FIG. 10 is a schematic diagram of a structural configuration of a device for localization and mapping, according to an example embodiment.

Embodiments of the present disclosure also provide a device based on the disclosed VSLAM technology. The device may be implemented in the mobile device. As shown in FIG. 10, the device may include at least one of a first receiving module 101, a matching module 102, a first computation module 103, or a first updating module 104. For example, in some embodiments, the device may include the first receiving module 101, the matching module 102, the first computation module 103, and the first updating module 104. In some embodiments, one or more of the modules 101-104 may be omitted.

The first receiving module 101 may be configured to receive an image obtained by the visual sensor 12.

The matching module 102 may be configured to retrieve a key frame from a pre-established key frame database, and after retrieving the key frame, to match the image with the retrieved key frame.

The first computation module 103 may be configured to compute relevant information of the visual relative pose based on the image and the key frame that have been successfully matched. The visual relative pose may be computed based on two-dimensional coordinates of matching feature points between the image and the key frame that have been successfully matched.

The first updating module 104 may be configured to, after the relevant information of the visual relative pose is obtained, update an absolute pose and a map of the mobile device based on the relevant information of the visual relative pose and the relevant information of the dead reckoning based relative pose.

In some embodiments, the key frame may include: an absolute pose. The absolute pose may be a pose of the mobile device in a global coordinate system when acquiring an image based on which the key frame is created. The map may include an absolute pose of at least one node. The device may also include:

a second updating module configured to update an absolute pose included in a key frame corresponding to a node based on an absolute pose of the node in the updated map.

In some embodiments, the first computation module may be configured to:

sort the key frames that have been successfully matched;

orderly select a key frame that has been successfully matched as a candidate frame;

compute a visual relative pose based on Epipolar geometry principles and based on two-dimensional coordinates of a feature point of an image and two-dimensional coordinates of a feature point of the candidate frame;

determine whether the visual relative pose is reasonable based on a predetermined reasonableness condition; and re-select another key frame as a candidate frame and perform subsequent computations until a cycle is terminated. The cycle is terminated when: the quantity (or number) of reasonable visual relative poses reaches a predetermined threshold number, or all of the key frames that have been successfully matched have been selected.

After the cycle is terminated, based on a determination that there is a reasonable visual relative pose, the reasonable visual relative pose and its relevant information may be added to the pre-processing result. The relevant information may include at least one of a covariance matrix or two associated node identifications. For example, the relevant information may include a covariance matrix and two associated node identifications.

In some embodiments, the device may also include:

a creation module configured to extract a feature point from an image to obtain two-dimensional coordinates of the feature point and a descriptor of the feature point, when a predetermined creation condition is satisfied. When the number of extracted feature points is greater than or equal to a predetermined extraction threshold value, a new key frame may be created, and the new key frame may be stored in the key frame database. The new key frame may be created based on at least one of: two-dimensional coordinates of the feature points or descriptors of the feature points. For example, the new key frame may be created based on the two-dimensional coordinates of the feature points and the descriptors of the feature points.

In some embodiments, the key frame may also include: an absolute pose. The absolute pose may be a pose of the mobile device in the global coordinate system when capturing an image based on which the key frame is created. The device may also include:

an acquisition module configured to compute an absolute pose corresponding to the image based on an absolute pose of a preceding image or key frame, and based on a dead reckoning based relative pose corresponding to a time interval between the image and the preceding image or key frame.

In some embodiments, the device may also include:

a second receiving module configured to receive an original pose obtained by the dead reckoning sensor 11; or to receive motion data obtained by the dead reckoning sensor 11, and to compute the original pose based on the motion data.

a second computation module configured to compute the relevant information of the dead reckoning based relative pose based on the original pose.

In some embodiments, the first updating module 104 may be configured to:

create a current node after the relevant information of the visual relative pose is obtained;

determine an odometer edge based on the relevant information of the dead reckoning based relative pose, and connect the current node to an existing, last created node through the odometer edge;

when there is a key frame associated with the current node in the existing nodes, determine a visual edge based on relevant information of the visual relative pose, and connect the current node to an associated key frame node through the visual edge; and perform a graph optimization based on the nodes and edges to obtain an updated absolute pose and an updated map of the mobile device.

In some embodiments, the device may include:

a third updating module configured to update an absolute pose of the mobile device at a most recent time instance based on the relevant information of the dead reckoning based relative pose when the relevant information of the visual relative pose cannot be or is not obtained.

In some embodiments, the two-dimensional coordinates are two-dimensional coordinates of a feature point in a pixel coordinate system.

In some embodiments, the first updating module 104 may be configured to: perform a filtering on the relevant information of the visual relative pose and the relevant information of the dead reckoning based relative pose, and update an absolute pose and a map of the mobile device.

Regarding the device of the above embodiments, the detailed manner in which various modules performs the operations has already been described in the embodiments of the related methods, which is not described in detail.

The disclosed method, controller, computer-readable storage medium, and mobile device may be implemented in an indoor application scene, such as indoor and cleaning.

It can be understood that descriptions of the same or similar features of the various embodiments can refer to each other. Features of some embodiments that are not described in detail can refer to descriptions of the same or similar features in other embodiments.

It should be noted that in the present description, the terms "first," "second," etc. are only used for descriptive purposes, and cannot be interpreted as indicating or implying the relevant importance. In addition, in the present description, the term "multiple" means two or more related items, unless noted otherwise.

The processes and methods shown in the flow charts or otherwise described or disclosed in any manner can be understood as one or more modules, segments, or parts of computer codes of executable instructions of steps configured to realize specific logic functions or processes. The scope of the embodiments of the present disclosure includes other implementations. The steps of the methods may not follow the illustrated or described order. For example, the involved functions may be executed in a substantially simultaneous manner or in an opposite order. Such arrangement of the steps of the methods should be understood by a person having ordinary skills in the art.

It should be understood that the various parts of the present disclosure may be implemented using hardware, software, firmware, or a combination thereof. In the above embodiments, multiple steps or methods may be stored in a memory and may be realized using software or firmware executable by a suitable instruction-executing system. For example, if the disclosed steps or methods are implemented using hardware, similar to other embodiments, the realization may be carried out using any of the following technologies known in the art or their combination: a discrete logic circuit of logic gate circuits configured to realize logic functions for digital signals, an application specific integrated circuit having suitable combinations of logic gate circuits, a programmable gate array ("PGA"), a field programmable gate array ("FPGA"), etc.

A person having ordinary skills in the art can appreciate that all or parts of the steps included in the disclosed methods may be implemented through a program instructing related hardware. The program may be stored in a computer-readable storage medium. When executed, the program may execute steps of the disclosed methods or their combination.

In addition, various functional units of various embodiments of the present disclosure may be integrated in a single processing unit, or each functional unit may individually and physically exist. In some embodiments, two or more units may be integrated in a single unit. The integrated unit may be realized using hardware or software functional modules. If the integrated module is realized using software functional modules and sold or used as an independent product, the integrated module may also be stored in a computer-readable storage medium.

The storage medium mentioned above may be a read-only memory, a random-access memory, a flash memory, an Electrically Programmable read only memory ("EPROM"), an Electrically Erasable Programmable read only memory ("EEPROM"), a register, a magnetic disk, or an optical disk, etc.

In the present description, descriptions of reference terms such as "an embodiment," "some embodiments," "example," "specific example," or "some examples," mean that characteristics, structures, materials, or features described in relation to the embodiment or example are included in at least one embodiment or example of the present disclosure. In the present description, illustrative expression of the above terms does not necessarily mean the same embodiment or example. Further, specific characteristics, structures, materials, or features may be combined in one or multiple embodiments or examples in a suitable manner.

The above illustrates and describes various embodiments of the present disclosure. These embodiments are illustrative, and should not be construed to limit the scope of the present disclosure. A person having ordinary skills in the art can change, modify, replace, or vary the above embodiments within the scope of the present disclosure. Such changes, modifications, replacements, or variations all fall within the scope of the present disclosure.

What is claimed is:

1. A method, comprising:
   acquiring, by a processor, an image through a visual sensor during a movement of a mobile device;
   matching, by the processor, the image with one or more key frames stored in a key frame database, wherein the one or more key frames are created based on two-dimensional coordinates of feature points included in a plurality of images previously acquired through the visual sensor;
   computing, by the processor, a visual relative pose based on two-dimensional coordinates of matching feature points included in both of the image and the one or more key frames that have been matched with the image;
   computing, by the processor, relevant information of the visual relative pose based on the two-dimensional coordinates of the matching feature points; and
   updating, by the processor, an absolute pose of the mobile device and a map based on the relevant information of the visual relative pose and relevant information of a dead reckoning based relative pose.

2. The method of claim 1, further comprising:
   acquiring, by the processor, an original pose of the mobile device through a dead reckoning sensor; and
   computing, by the processor, the relevant information of the dead reckoning based relative pose based on the original pose.

3. The method of claim 1, further comprising:
   receiving, by the processor, motion data obtained by a dead reckoning sensor;
   computing, by the processor, an original pose based on the motion data; and
   computing, by the processor, the relevant information of the dead reckoning based relative pose based on the original pose.

4. The method of claim 1, wherein computing, by the processor, the visual relative pose is performed based on two-dimensional coordinates of matching feature points included in both of the image and the one or more key frames that have been matched with the image, and is not based on three-dimensional coordinates of a spatial object corresponding to a feature point included in the image.

5. The method of claim 1, wherein computing, by the processor, the relevant information of the visual relative pose comprises:
   sorting, by the processor, the one or more key frames that have been matched with the image;
   selecting, by the processor, a first key frame that has been matched with the image as a candidate frame;
   computing, by the processor, the visual relative pose based on the two-dimensional coordinates of the matching feature points included in both of the image and the candidate frame;
   determining, by the processor, whether the visual relative pose satisfies a predetermined reasonableness condition;
   re-selecting, by the processor, a second key frame as the candidate frame and performing the step of computing the visual relative pose and the step of determining whether the visual relative pose satisfies the predetermined reasonableness condition, until a number of visual relative poses satisfying the predetermined reasonableness condition reaches a predetermined threshold number, or until all key frames that have been successfully matched with the image have been selected; and based on a determination that there is a visual relative pose that satisfies the predetermined reasonableness condition, obtaining, by the processor, relevant information of the visual relative pose that satisfies the predetermined reasonableness condition.

6. The method of claim 1, further comprising:

based on a determination that a predetermined creation condition is satisfied, extracting, by the processor, feature points from the plurality of images previously acquired through the visual sensor, and obtaining, by the processor, two-dimensional coordinates and descriptors of the extracted feature points; and based on a determination that a number of the extracted feature points is greater than or equal to a predetermined extraction threshold value, creating, by the processor, a key frame based on the two-dimensional coordinates and the descriptors of the extracted feature points.

7. A mobile device, comprising:

a dead reckoning sensor configured to obtain motion data during a movement of the mobile device;

a visual sensor configured to acquire a plurality of images of an environment in which the mobile device operates; and a controller operably coupled with the dead reckoning sensor and the visual sensor, and configured to:

acquire an image through the visual sensor during the movement of the mobile device;

match the image with one or more key frames stored in a key frame database, wherein the one or more key frames are created based on two-dimensional coordinates of feature points included in the plurality of images previously acquired by the visual sensor;

compute a visual relative pose based on two-dimensional coordinates of matching feature points included in both of the image and the one or more key frames that have been matched with the image;

compute relevant information of the visual relative pose based on the two-dimensional coordinates of the matching feature points; and update an absolute pose of the mobile device and a map based on the relevant information of the visual relative pose and relevant information of a dead reckoning based relative pose obtained based on the motion data.

8. The mobile device of claim 7, wherein the controller is further configured to compute an original pose based on the motion data, and compute the relevant information of the dead reckoning based relative pose based on the original pose.

9. The mobile device of claim 7, wherein the visual relative pose is computed based on two-dimensional coordinates of matching feature points included in both of the image and the one or more key frames that have been matched with the image, and is not based on three-dimensional coordinates of a spatial object corresponding to a feature point included in the image.

10. The mobile device of claim 7, wherein when the controller is configured to compute the relevant information of the visual relative pose, the controller is configured to:

sort the one or more key frames that have been matched with the image;

select a first key frame that has been matched with the image as a candidate frame;

compute the visual relative pose based on the two-dimensional coordinates of the matching feature points included in both of the image and the candidate frame;

determine whether the visual relative pose satisfies a predetermined reasonableness condition;

re-select a second key frame as the candidate frame and perform the step of computing the visual relative pose and the step of determining whether the visual relative pose satisfies the predetermined reasonableness condition, until a number of visual relative poses satisfying the predetermined reasonableness condition reaches a predetermined threshold number, or until all key frames that have been successfully matched with the image have been selected; and based on a determination that there is a visual relative pose that satisfies the predetermined reasonableness condition, obtain relevant information of the visual relative pose that satisfies the predetermined reasonableness condition.

11. The mobile device of claim 7, wherein the controller is configured to:

based on a determination that a predetermined creation condition is satisfied, extract feature points from the plurality of images previously acquired through the visual sensor, and obtain two-dimensional coordinates and descriptors of the extracted feature points; and based on a determination that a number of the extracted feature points is greater than or equal to a predetermined extraction threshold value, create a key frame based on the two-dimensional coordinates and the descriptors of the extracted feature points.

12. A non-transitory computer-readable storage medium storing computer-executable instructions, which when executed by a processor, are configured to cause the processor to perform a method comprising:

acquiring an image through a visual sensor during a movement of a mobile device;

matching the image with one or more key frames stored in a key frame database, wherein the one or more key frames are created based on two-dimensional coordinates of feature points included in a plurality of images previously acquired through the visual sensor;

computing a visual relative pose based on two-dimensional coordinates of matching feature points included in both of the image and the one or more key frames that have been matched with the image;

computing relevant information of the visual relative pose based on the two-dimensional coordinates of the matching feature points; and updating an absolute pose of the mobile device and a map based on the relevant information of the visual relative pose and relevant information of a dead reckoning based relative pose.

13. The non-transitory computer-readable storage medium of claim 12, wherein the method further comprises:

acquiring an original pose of the mobile device through a dead reckoning sensor; and computing the relevant information of the dead reckoning based relative pose based on the original pose.

14. The non-transitory computer-readable storage medium of claim 12, wherein the method further comprises:

receiving motion data obtained by a dead reckoning sensor;

computing an original pose based on the motion data; and computing the relevant information of the dead reckoning based relative pose based on the original pose.

15. The non-transitory computer-readable storage medium of claim 12, wherein computing the visual relative pose is performed based on two-dimensional coordinates of matching feature points included in both of the image and the one or more key frames that have been matched with the image, and is not based on three-dimensional coordinates of a spatial object corresponding to a feature point included in the image.

16. The non-transitory computer-readable storage medium of claim 12, wherein computing the relevant information of the visual relative pose comprises:

sorting the one or more key frames that have been matched with the image;

selecting a first key frame that has been matched with the image as a candidate frame;

computing the visual relative pose based on the two-dimensional coordinates of the matching feature points included in both of the image and the candidate frame;

determining whether the visual relative pose satisfies a predetermined reasonableness condition;

re-selecting a second key frame as the candidate frame and performing the step of computing the visual relative pose and the step of determining whether the visual relative pose satisfies the predetermined reasonableness condition, until a number of visual relative poses satisfying the predetermined reasonableness condition reaches a predetermined threshold number, or until all key frames that have been successfully matched with the image have been selected; and based on a determination that there is a visual relative pose that satisfies the predetermined reasonableness condition, obtaining relevant information of the visual relative pose that satisfies the predetermined reasonableness condition.

17. The non-transitory computer-readable storage medium of claim 12, wherein the method further comprises:

based on a determination that a predetermined creation condition is satisfied, extracting feature points from the plurality of images previously acquired through the visual sensor, and obtaining two-dimensional coordinates and descriptors of the extracted feature points; and based on a determination that a number of the extracted feature points is greater than or equal to a predetermined extraction threshold value, creating a key frame based on the two-dimensional coordinates and the descriptors of the extracted feature points.

18. A controller, comprising:

a processor; and the non-transitory computer-readable storage medium according to claim 12.

19. The controller of claim 18, wherein computing the visual relative pose is performed based on two-dimensional coordinates of matching feature points included in both of the image and the one or more key frames that have been matched with the image, and is not based on three-dimensional coordinates of a spatial object corresponding to a feature point included in the image.

20. The controller of claim 18, wherein computing the relevant information of the visual relative pose comprises:

sorting the one or more key frames that have been matched with the image;

selecting a first key frame that has been matched with the image as a candidate frame;

computing the visual relative pose based on the two-dimensional coordinates of the matching feature points included in both of the image and the candidate frame;

determining whether the visual relative pose satisfies a predetermined reasonableness condition;

re-selecting a second key frame as the candidate frame and performing the step of computing the visual relative pose and the step of determining whether the visual relative pose satisfies the predetermined reasonableness condition, until a number of visual relative poses satisfying the predetermined reasonableness condition reaches a predetermined threshold number, or until all key frames that have been successfully matched with the image have been selected; and based on a determination that there is a visual relative pose that satisfies the predetermined reasonableness condition, obtaining relevant information of the visual relative pose that satisfies the predetermined reasonableness condition.

* * * * *